(12) United States Patent
Schuknecht et al.

(10) Patent No.: US 12,031,750 B2
(45) Date of Patent: Jul. 9, 2024

(54) MODIFIED CLAMP

(71) Applicant: ARRAY TECHNOLOGIES, INC., Albuquerque, NM (US)

(72) Inventors: Nathan Schuknecht, Golden, CO (US); Todd Andersen, Heber City, UT (US); John Nagyvary, Albuquerque, NM (US); Jon Sharp, Fort Collins, CO (US); Alex Cisneros, Albuquerque, NM (US); Bhanu Prasad Tuniki, Albuquerque, NM (US); Ronald Corio, Los Ranchos, NM (US); Kyumin Lee, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 242 days.

(21) Appl. No.: 17/119,701

(22) Filed: Dec. 11, 2020

(65) Prior Publication Data

US 2021/0180832 A1  Jun. 17, 2021

Related U.S. Application Data

(60) Provisional application No. 63/022,681, filed on May 11, 2020, provisional application No. 62/948,132, filed on Dec. 13, 2019.

(51) Int. Cl.
*H02S 30/10* (2014.01)
*F16B 2/06* (2006.01)
(Continued)

(52) U.S. Cl.
CPC ............. *F24S 25/634* (2018.05); *F16B 2/06* (2013.01); *F24S 2025/6003* (2018.05)

(58) Field of Classification Search
None
See application file for complete search history.

(56) References Cited

U.S. PATENT DOCUMENTS 8,459,249 B2  6/2013 Corio
8,919,052 B2  12/2014 West
(Continued)

OTHER PUBLICATIONS

International Search Report and Written Opinion, as issued in connection with International Patent Application No. PCT/US2020/064715, dated Mar. 18, 2021, 9 pgs.
(Continued)

*Primary Examiner* — Steven M Marsh
(74) *Attorney, Agent, or Firm* — MASCHOFF BRENNAN

(57) ABSTRACT

A mounting system may include a frame associated with a power-generating device, the frame including an opening. The mounting system may include a bracket mounting assembly. The bracket mounting assembly may include a top member having a first surface, a clamp, and a single bolt passing through both the top member and the clamp such that the clamp moves along an interface between the first and a second surfaces as the single bolt is tightened. The clamp may include the second surface corresponding to the first surface, an arm projecting away from the top member, and a flange at least proximate a top of the arm. The flange may include an ear at the top of the arm and a tab on a bottom side of the ear projecting back towards the top member, the tab positioned to interface with the opening on the frame.

16 Claims, 36 Drawing Sheets

(51) Int. Cl.
*F24S 25/634* (2018.01)
*F24S 25/60* (2018.01)

(56) References Cited

U.S. PATENT DOCUMENTS

| | | | |
|---|---|---|---|
| 9,003,726 | B2 | 4/2015 | Sader |
| 9,276,521 | B2 | 3/2016 | Reed et al. |
| 9,281,778 | B2 | 3/2016 | Corio et al. |
| 9,581,678 | B2 | 2/2017 | Corio |
| 9,631,840 | B2 | 4/2017 | Corio |
| 10,042,030 | B2 | 8/2018 | Corio |
| 10,069,455 | B2 | 9/2018 | Corio et al. |
| 10,536,109 | B2 | 1/2020 | Corio |
| 10,557,646 | B1 | 2/2020 | Ma et al. |
| 10,684,348 | B2 | 6/2020 | Arliaud et al. |
| 10,771,007 | B2 | 9/2020 | Corio |
| 10,809,345 | B2 | 10/2020 | Corio |
| 2010/0089389 | A1 | 4/2010 | Seery et al. |
| 2015/0200621 | A1 | 7/2015 | Reed et al. |
| 2016/0329860 | A1* | 11/2016 | Kalus ............... H02S 20/10 |
| 2018/0062565 | A1* | 3/2018 | Schimelpfenig ...... H02S 20/32 |
| 2020/0052643 | A1* | 2/2020 | Ballentine .......... F16M 11/10 |
| 2020/0373878 | A1* | 11/2020 | Smith ............... F16H 25/2018 |
| 2022/0052636 | A1* | 2/2022 | Au ................. H02S 20/32 |
| 2022/0077816 | A1* | 3/2022 | Morin ............... H02S 20/32 |
| 2022/0294387 | A1* | 9/2022 | Shah ................ G01W 1/10 |
| 2022/0407450 | A1* | 12/2022 | Conger ............. H02S 20/32 |

OTHER PUBLICATIONS

U.S. Appl. No. 15/931,301, filed May 13, 2020, titled: Mounting Bracket Extension.

U.S. Appl. No. 17/014,848, filed Sep. 8, 2020, titled: Spring Counter-Balance Assemblies and Solar Trackers Incorporating Spring Counter-Balance Assemblies.

U.S. Appl. No. 17/014,850, filed Sep. 8, 2020, titled: Torsion Limiter Devices, Systems and Methods and Solar Trackers Incorporating Torsion Limiters.

U.S. Appl. No. 17/061,341, filed Oct. 1, 2020, titled: Solar Tracking System.

U.S. Appl. No. 17/061,350, filed Oct. 1, 2020, titled: Solar Tracking During Persistent Cloudy Conditions.

U.S. Appl. No. 17/170,820, filed Feb. 8, 2021, titled: Clip-On Mounting Rails, Mounting Brackets, and Methods of Mounting Solar Modules.

* cited by examiner

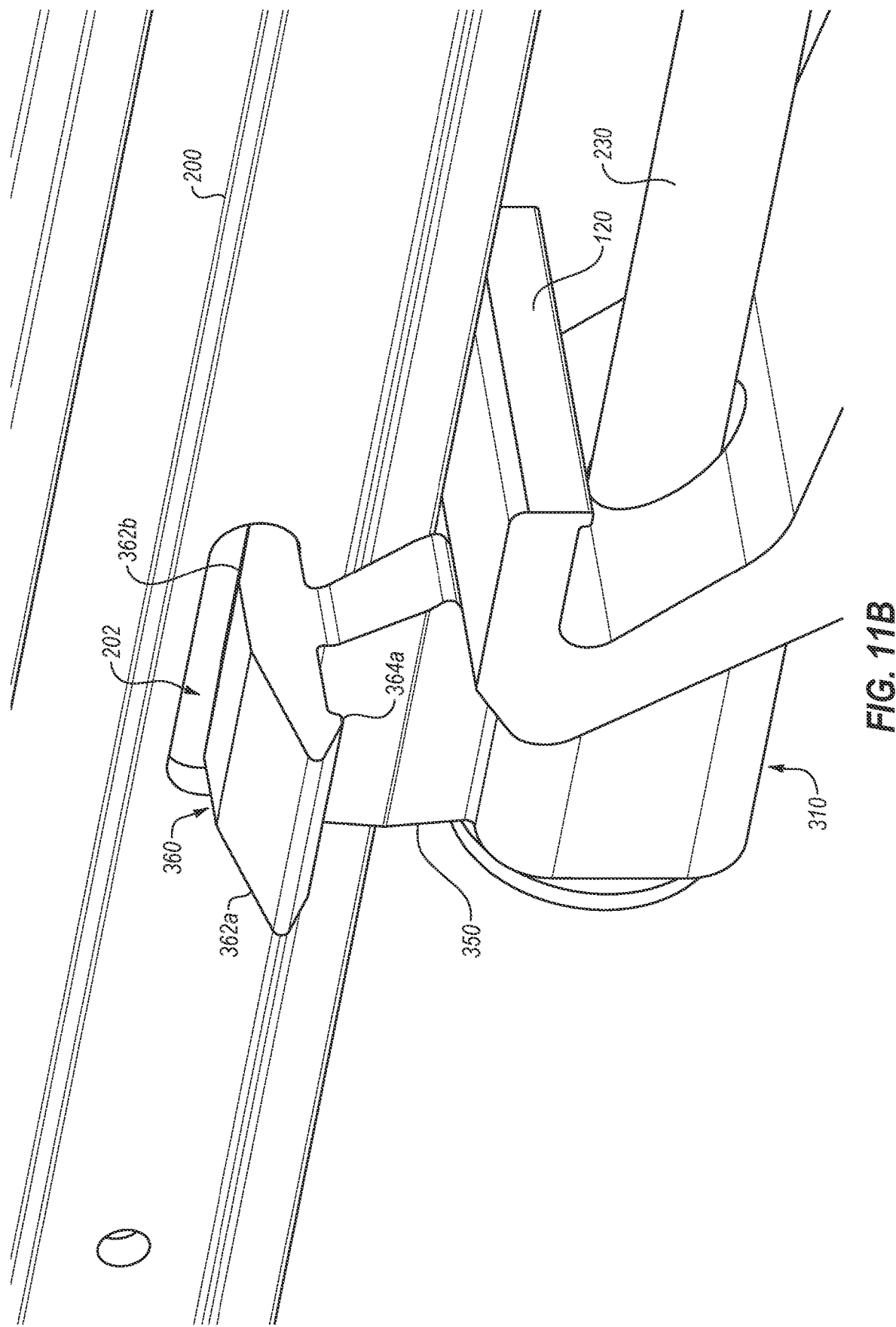

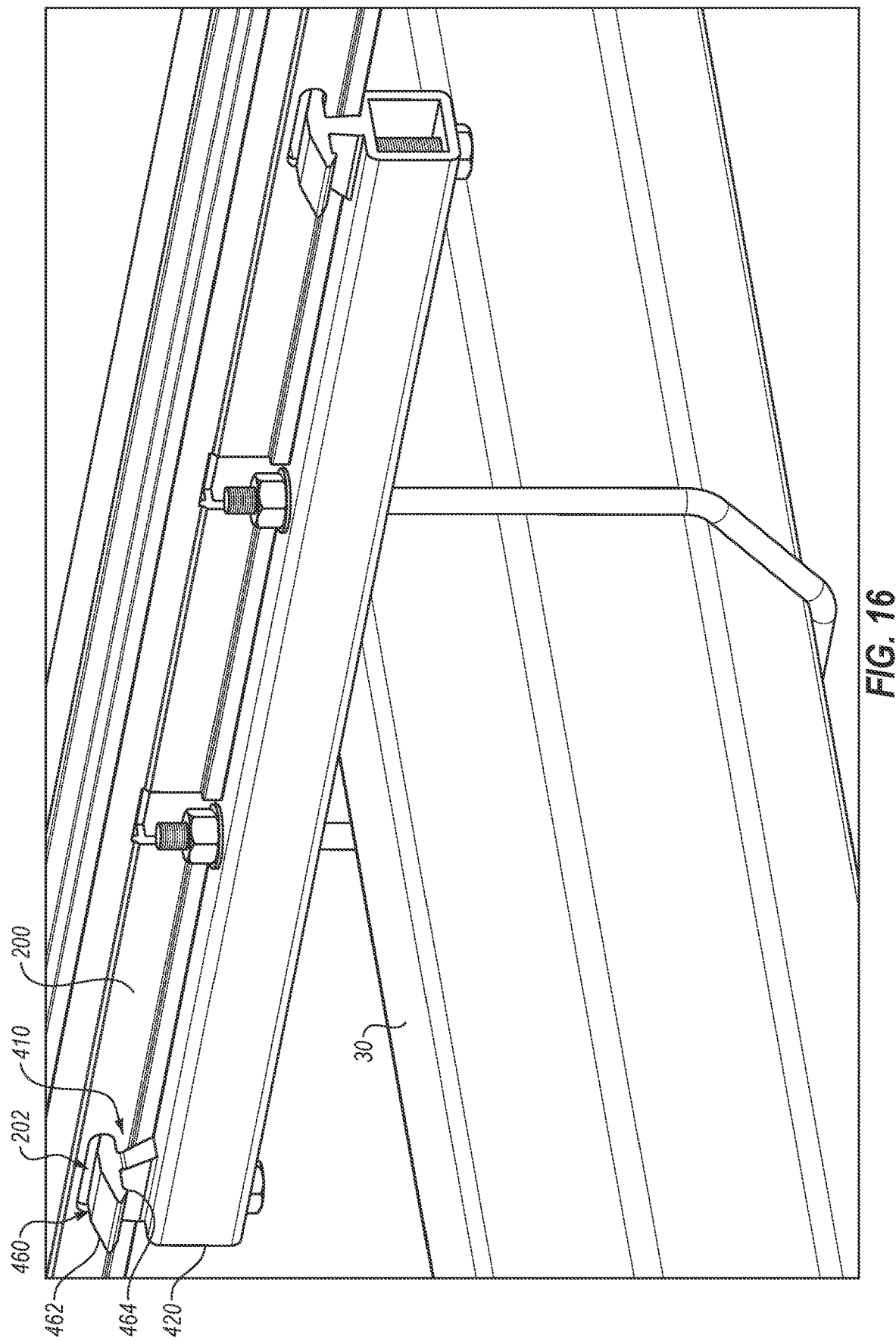

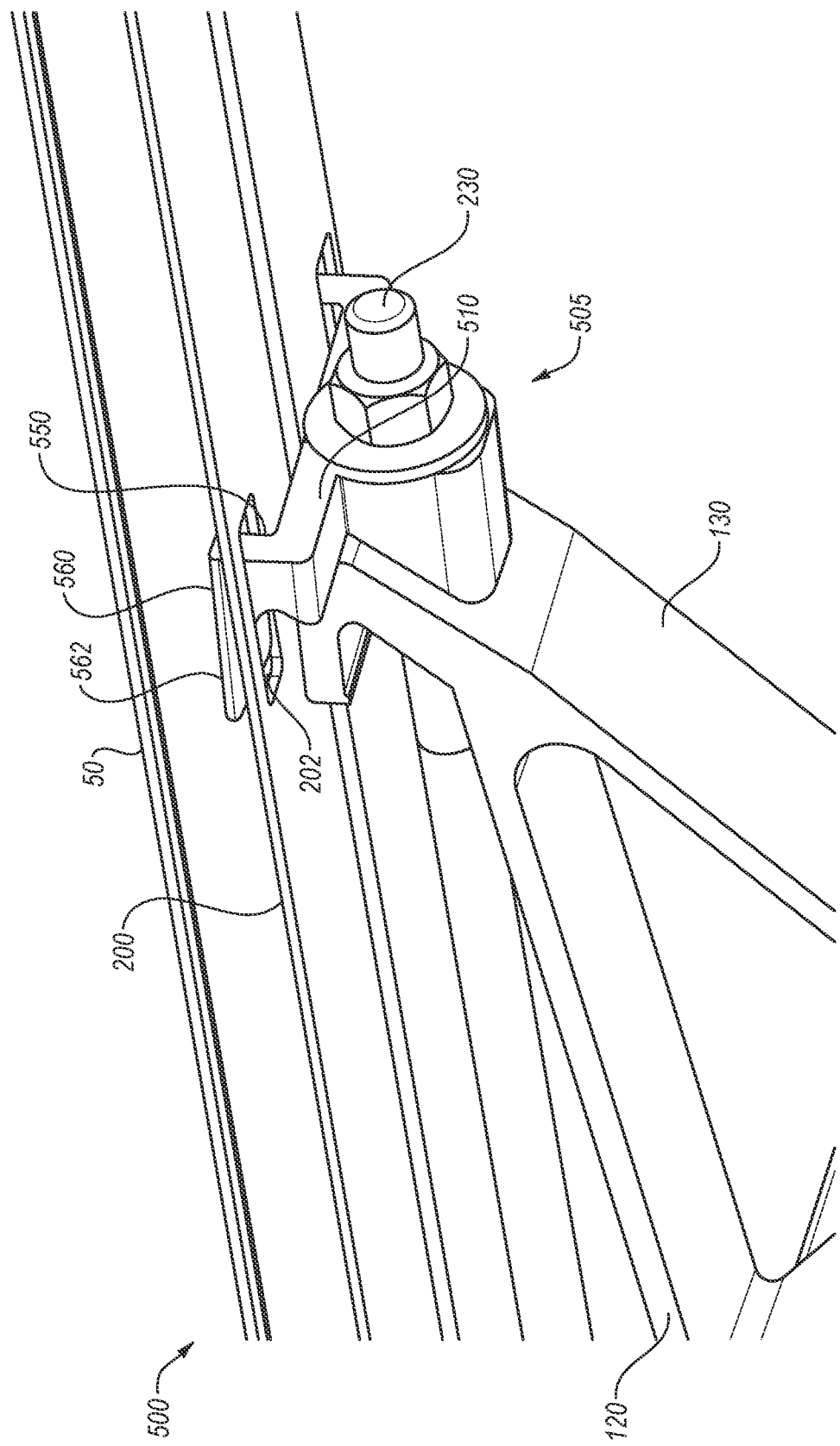

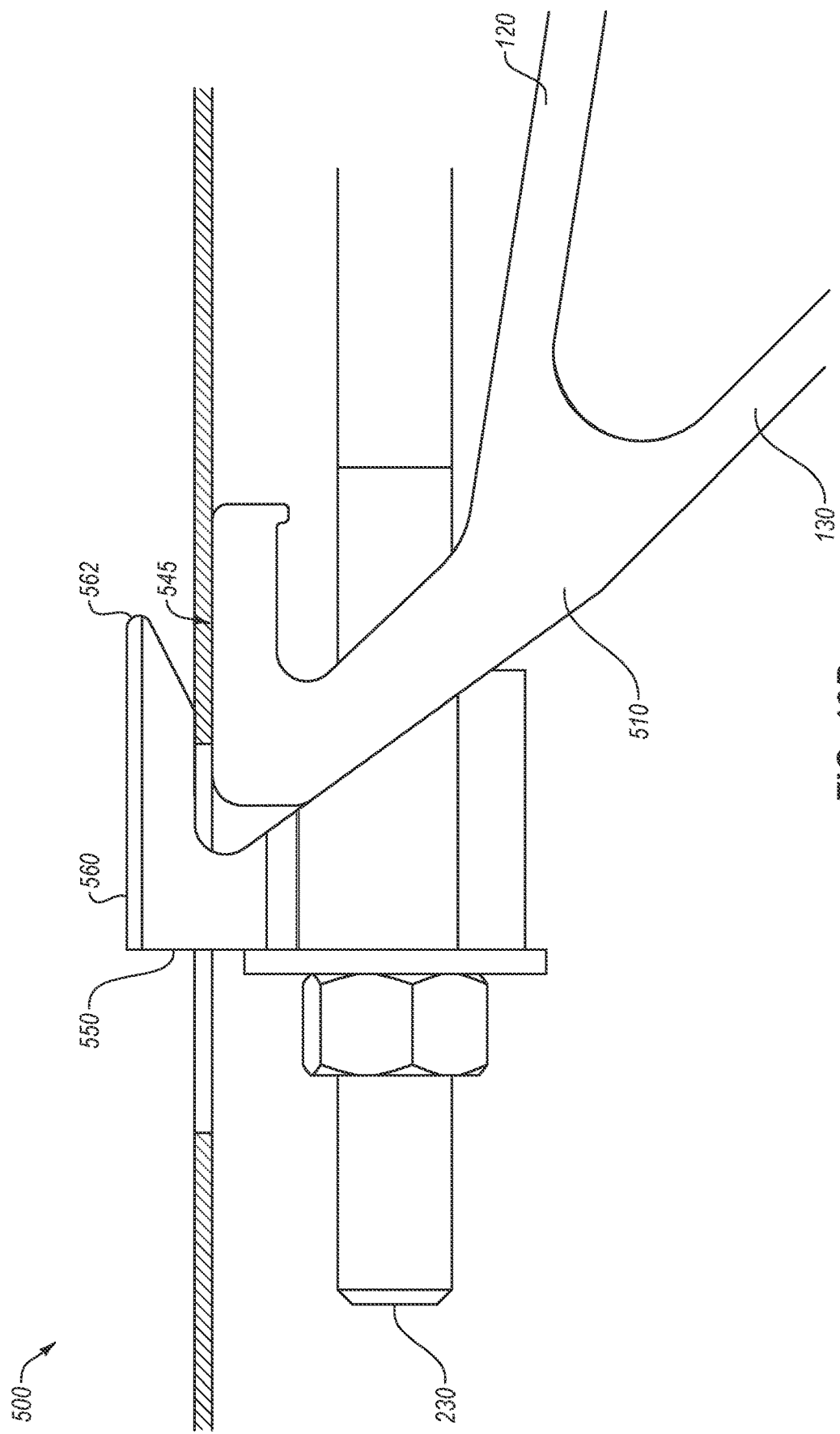

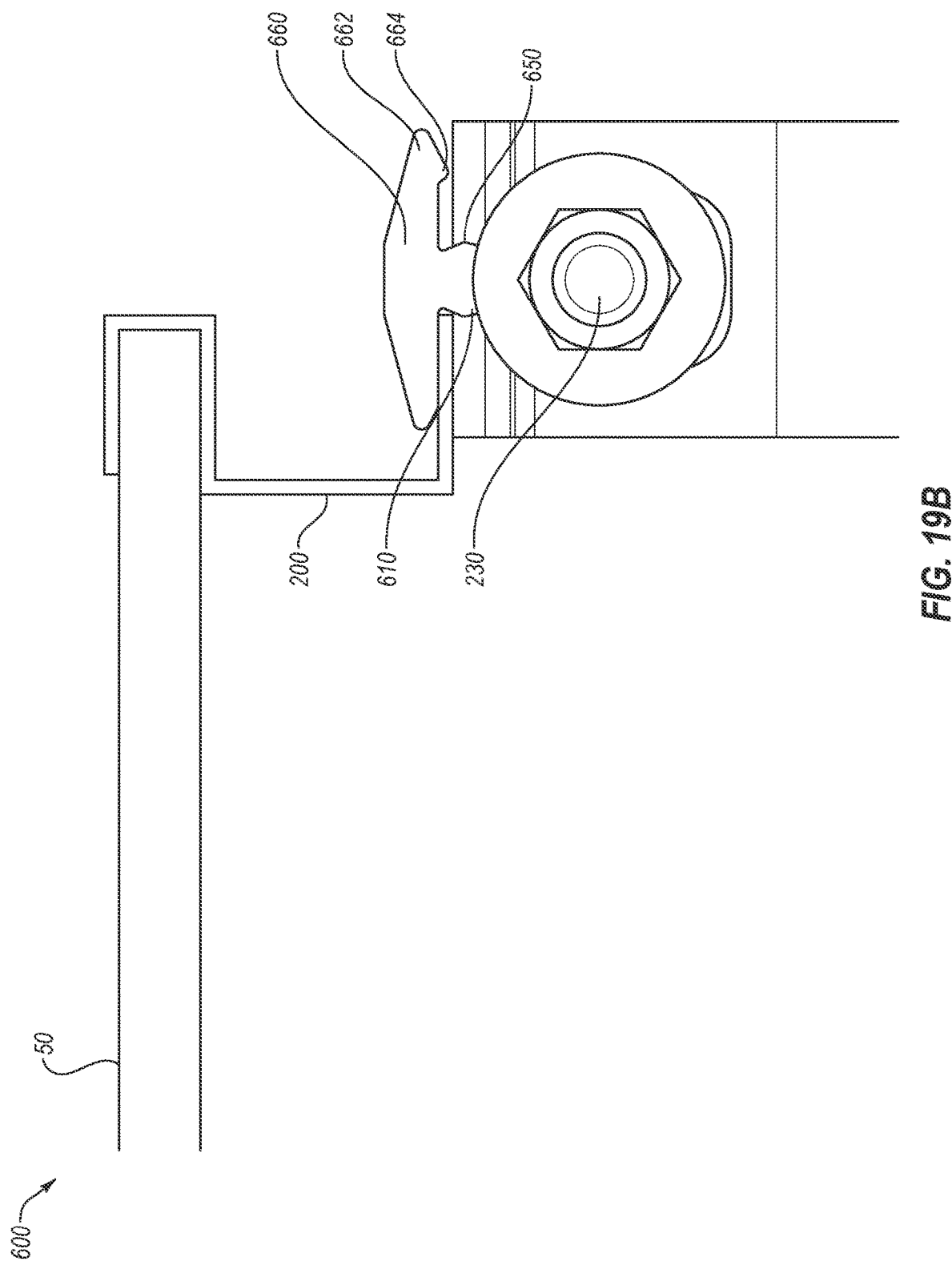

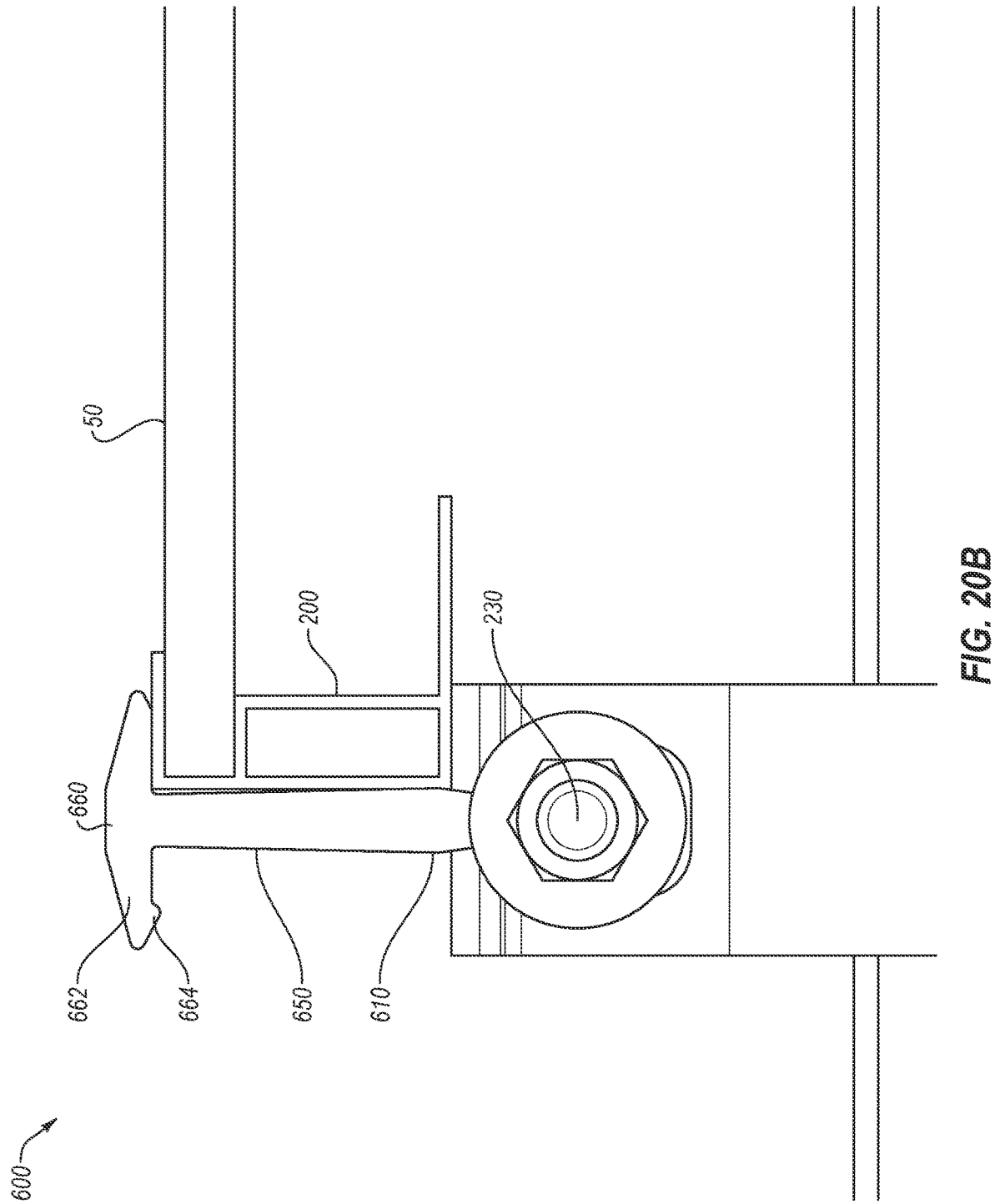

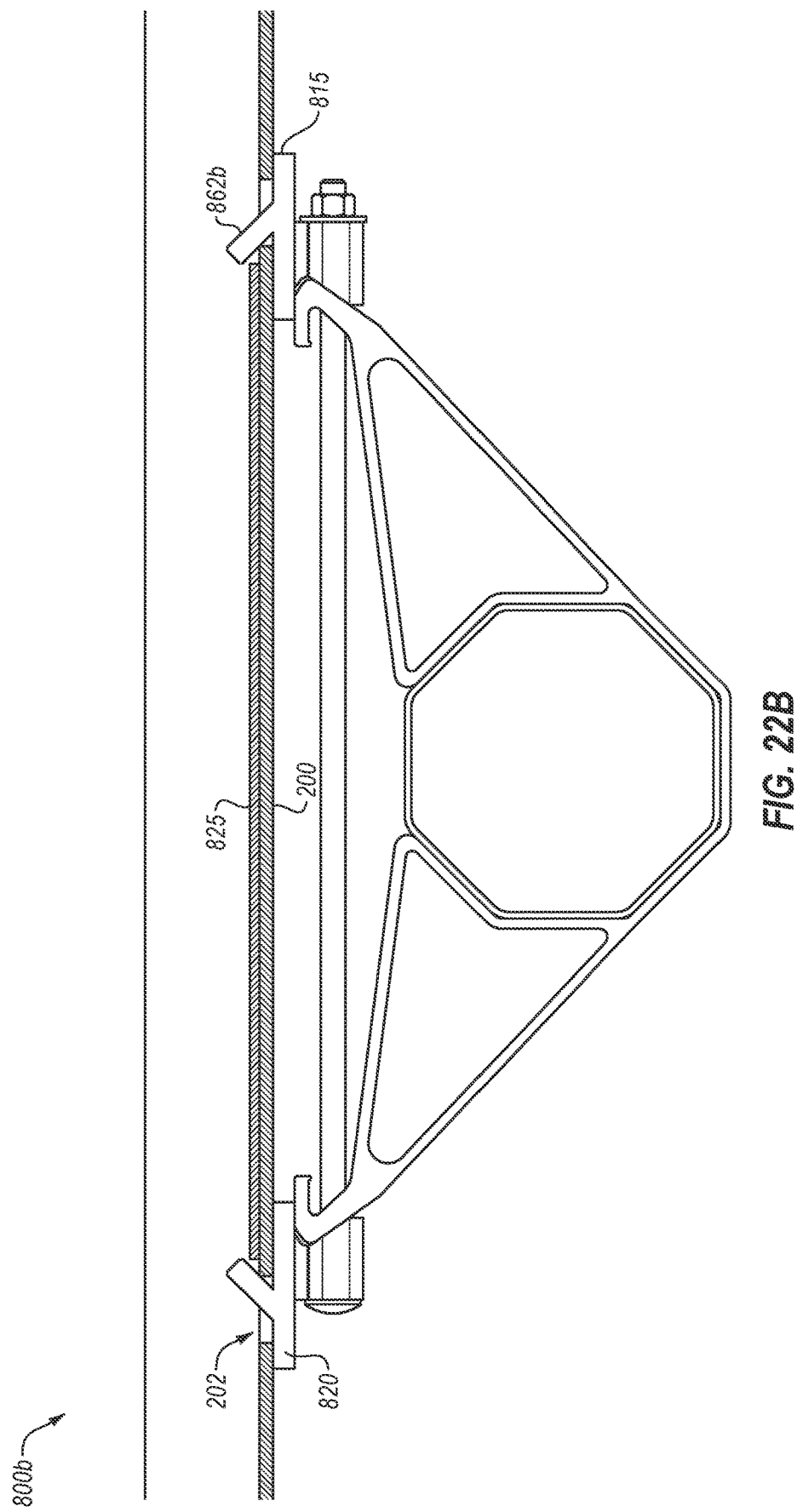

MODIFIED CLAMP

CROSS-REFERENCE TO RELATED APPLICATIONS

The present application claims priority to and the benefit of U.S. Provisional Patent Application Ser. No. 62/948,132, entitled MODIFIED CLAMP, which was filed on Dec. 13, 2019, and is hereby incorporated by reference in its entirety.

The present application claims priority to and the benefit of U.S. Provisional Patent Application Ser. No. 63/022,681, entitled MODIFIED CLAMP AND SLOTS, which was filed on May 11, 2020, and is hereby incorporated by reference in its entirety.

BACKGROUND

Most photovoltaic ("PV") modules are quite heavy because they use glass to encase the PV cells. A solar mounting system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with significant horsepower. Therefore, mounting and tracking systems for PV modules typically are relatively large, complex assemblies comprising large, heavy components.

These components can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting system components that minimize the overall use of material to be lighter weight and reduce costs. In addition, there is a need for PV mounting system components that can reduce the time necessary for installation and for quality control during construction in the field.

Accordingly, there is a need for PV mounting system components that efficiently use structural material only where it is needed. There is also a need for a PV mounting system with components that provide easier and quicker installation and quality control capability.

SUMMARY

Embodiments of the present disclosure alleviate to a great extent the disadvantages of known mounting systems and solar trackers and associated components by providing a mounting bracket assembly comprising a flexible body having material in the form of the stresses on the system and a configuration that facilitates secure connection between a PV module and a rounded or other hollow shaped torsion beam with a single bolt.

Example embodiments of a mounting bracket assembly may comprise a flexible body including at least one top member and a flexible angled bottom member connected to the top member. The flexible body may define a beam insertion aperture between the top member and the bottom member. At least one clamp may be attached to the top member. The mounting bracket assembly may further comprise a threaded rod or cap screw and a clamping nut securing the threaded rod to the top member.

In one or more example embodiments, a threaded rod may run through the at least one top member and the at least one clamp and may secure the clamp to the top member. In some embodiments, the at least one clamp may include one or more specific features to facilitate locking and aligning the PV module when the PV module is attached to the mounting bracket and torsion beam.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limit its scope. Additionally, it will be appreciated that while the drawings may illustrate preferred sizes, scales, relationships and configurations of the invention, the drawings are not intended to limit the scope of the claimed invention. Example embodiments will be described and explained with additional specificity and detail through the use of the accompanying drawings in which:

FIGS. 11A-11B illustrate a close-up view of operation of an example mounting bracket assembly in accordance with the present disclosure;

FIG. 16 is an isometric view of another example embodiment of a clamp in accordance with the present disclosure;

FIG. 17A-17B illustrate another example embodiment of a mounting system and a mounting bracket assembly in accordance with the present disclosure;

FIG. 18A-18B are close-up perspective views of the mounting system and mounting bracket assembly of FIGS. 17A-17B;

FIG. 19B is a side view of the example embodiment of FIG. 19A;

FIG. 20B is a side view of the example embodiment of FIG. 20A;

FIGS. 22A and 22B are side views of an example embodiment of a mounting system and mounting bracket assembly in accordance with the present disclosure;

DETAILED DESCRIPTION

Figure 1:
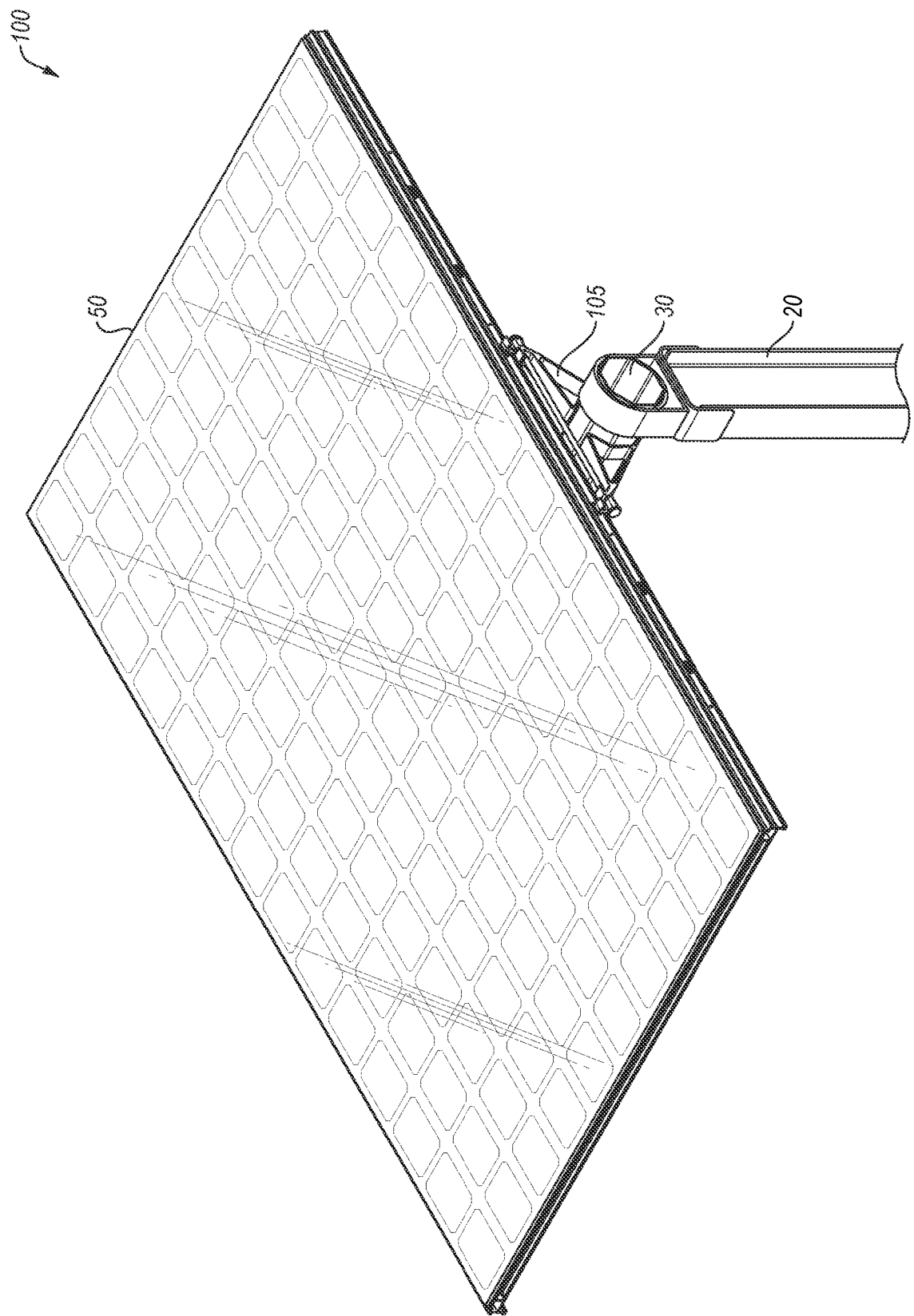
FIG. 1 is a front perspective view of an example embodiment of a mounting system and mounting bracket assembly in accordance with the present disclosure.
Figure 2:
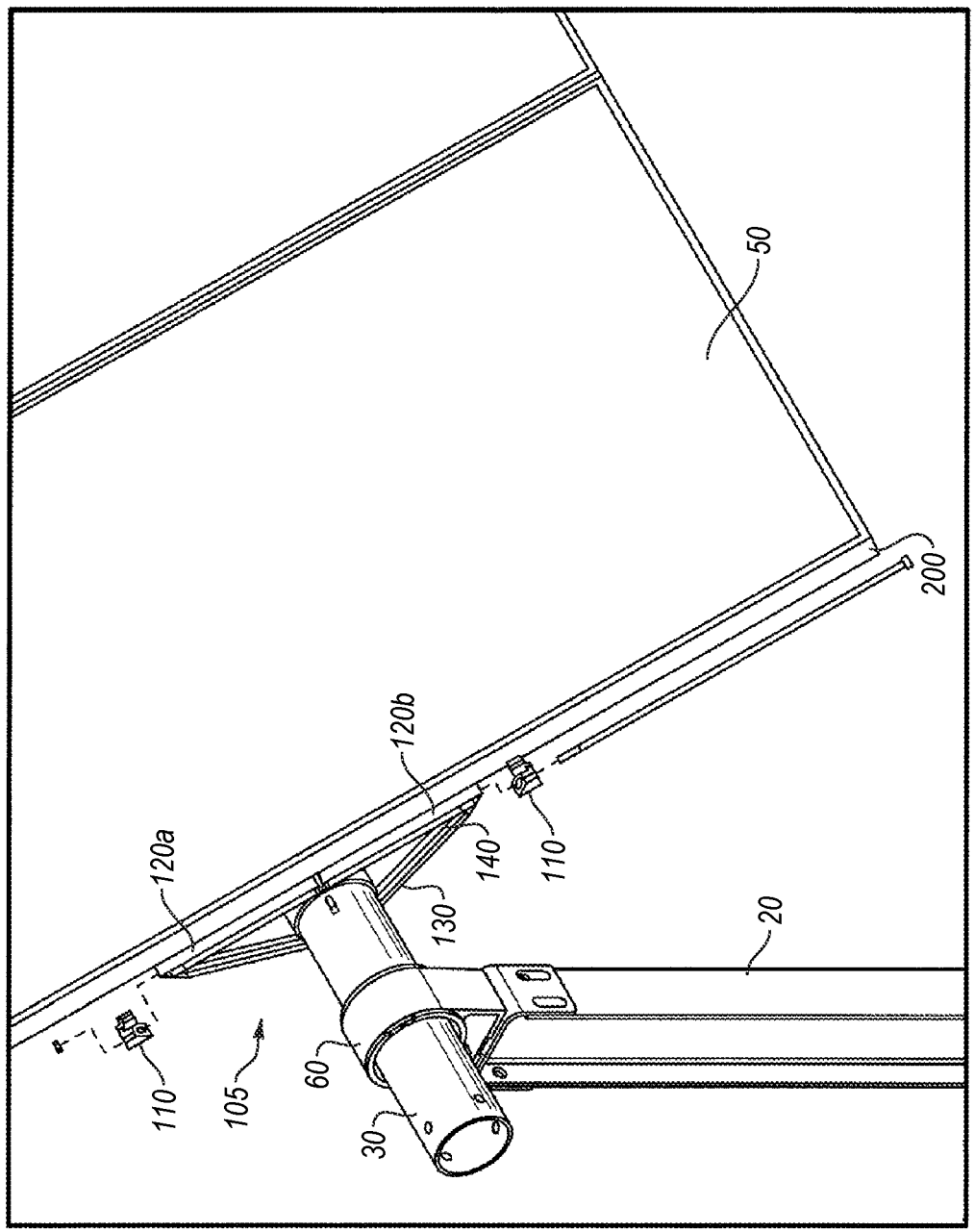
FIG. 2 is a front perspective view of an example embodiment of a mounting system and mounting bracket assembly in accordance with the present disclosure.
Figure 3:
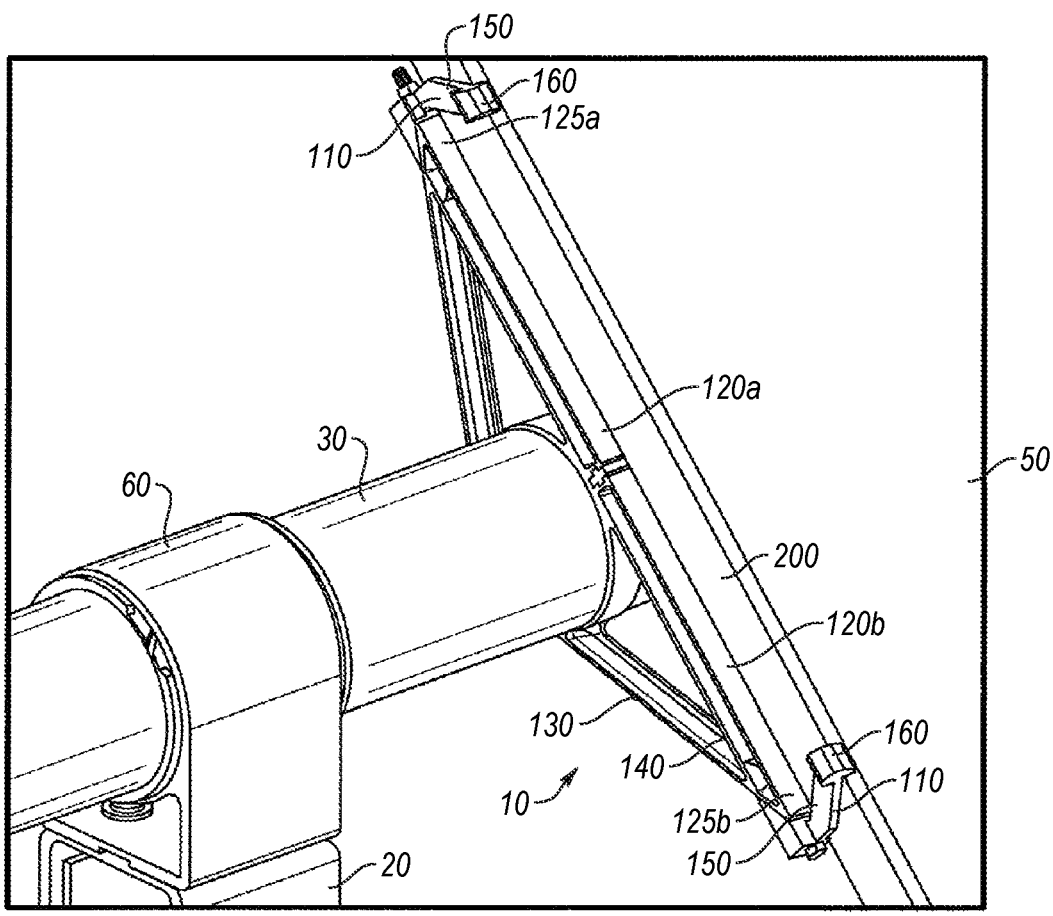
FIG. 3 is a detail perspective view of an example embodiment of a mounting system and mounting bracket assembly in accordance with the present disclosure.
Figure 4A:
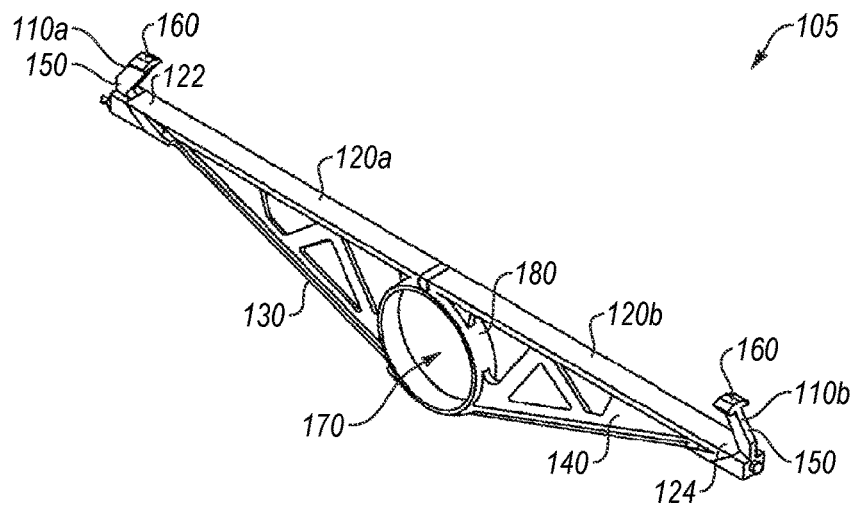
FIG. 4A is a perspective view of an example embodiment of a mounting bracket assembly in accordance with the present disclosure.
Figure 4B:
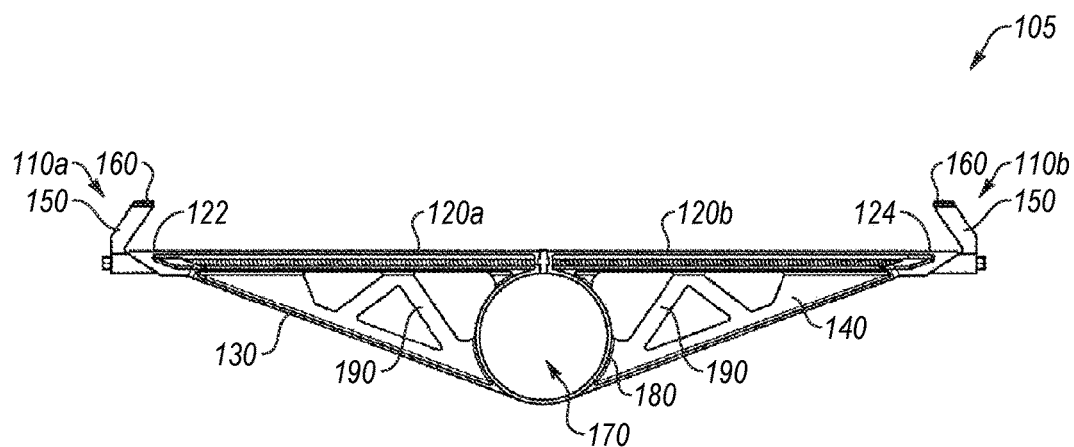
FIG. 4B is a front view of the mounting bracket assembly of FIG. 4A.
Figure 4C:
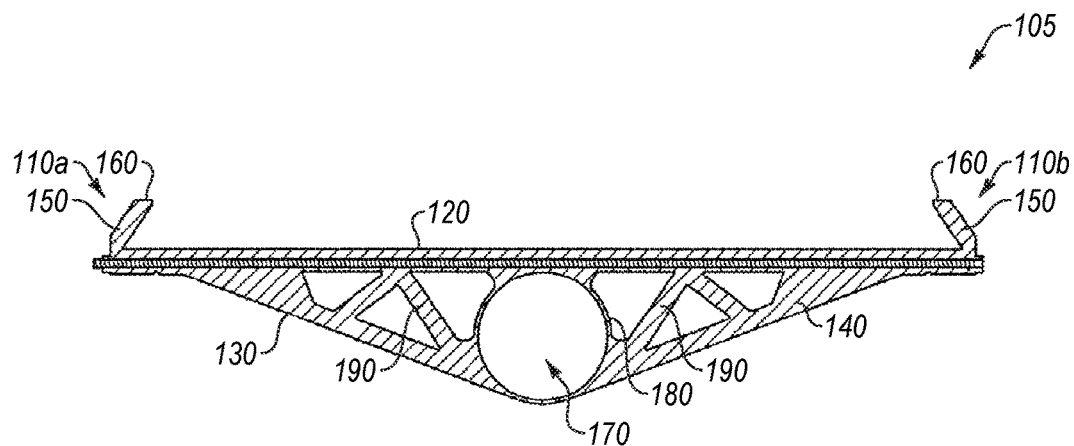
FIG. 4C is a front cross-sectional view of the mounting bracket assembly of FIG. 4A.
Figure 5A:
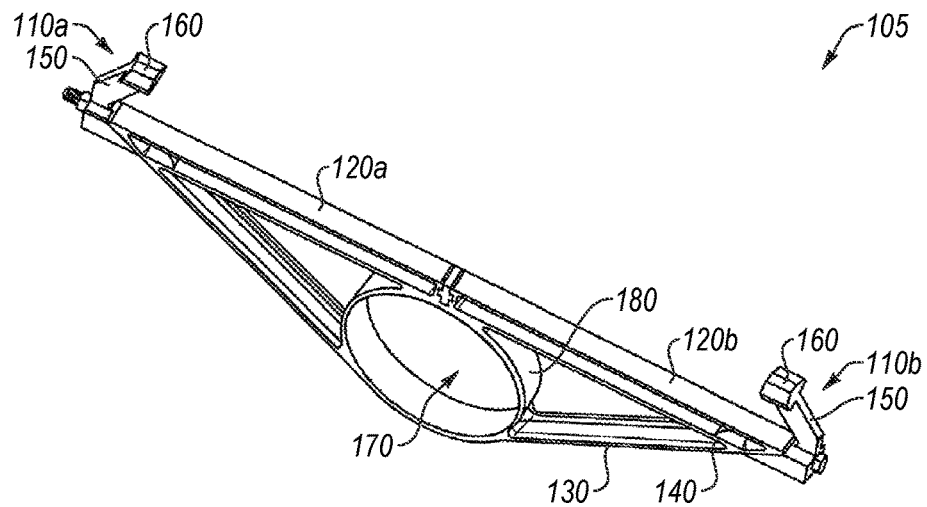
FIG. 5A is a perspective view of an example embodiment of a mounting bracket assembly in accordance with the present disclosure.
Figure 5B:
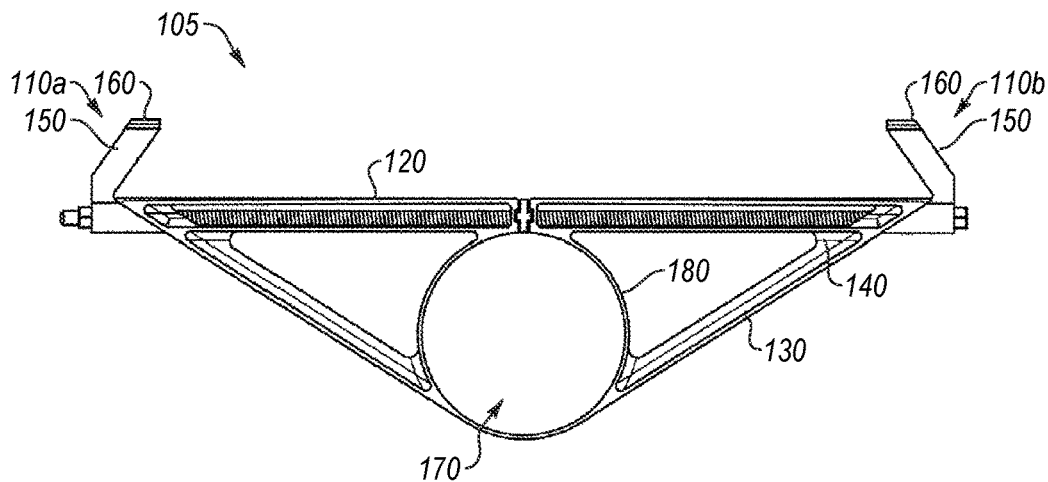
FIG. 5B is front view of the mounting bracket assembly of FIG. 5A.
Figure 5C:
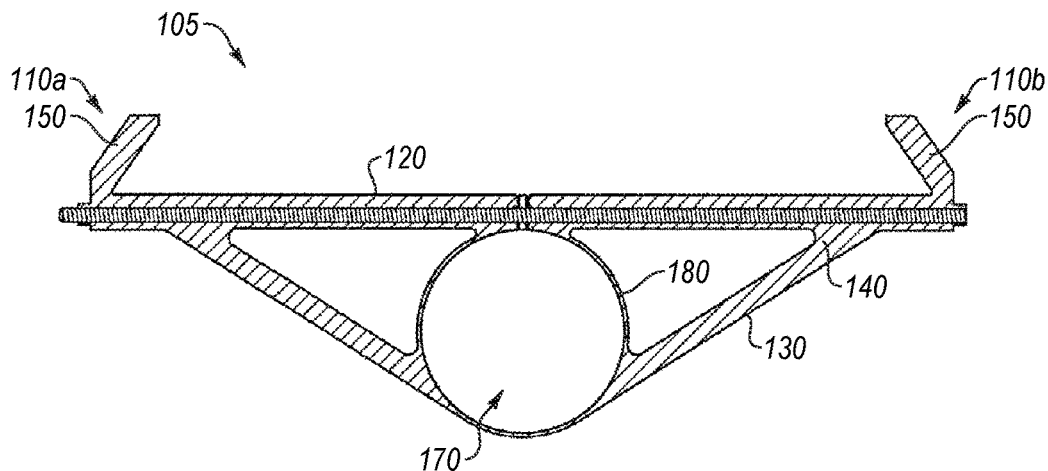
FIG. 5C is a front cross-sectional view of the mounting bracket assembly of FIG. 5A.

In general, embodiments of the present disclosure relate to mounting bracket assemblies, mounting assembly components, systems and associated methods. Example embodiments make efficient use of structural material by using a flexible structural piece to secure an electricity generating device. An electricity generating device may include any kind of device that directly or indirectly converts solar radiation to electricity or collects, reflects, or concentrates solar radiation, including photovoltaic cells or modules, solar thermal devices, solar energy collectors, or components thereof. Disclosed assemblies and methods may provide easier quality control capabilities. More particularly, rotating a single clamping nut may secure an electricity generating device such as a photovoltaic ("PV") module to a rounded torsion beam. Additionally, by providing an interacting clamping feature that interfaces with the frame of a PV module, the alignment, security, and orientation of such PV modules may be enhanced, and the installation thereof expedited. These and additional advantages are explained in more detail below.

Additionally, to assist in the description of the mounting bracket, words such as top, bottom, front, rear, right and left are used to describe the accompanying figures. It will be appreciated, however, that the mounting bracket can be disposed and/or located in a variety of desired positions, including various angles, sideways and even upside down.

To provide context for the present disclosure, example embodiments of a mounting bracket assembly will be described. Disclosed mounting bracket assemblies and methods can be used in a number of different contexts. One such application is in a solar mounting and/or tracking system. An example mounting bracket assembly may be used to mount a mounting rack to a torsion beam. The torsion beam may be any shape, including but not limited to, round, square, hexagonal, octagonal, or any hybrid shape such as rounded with flats on one or more sides. One of the advantages of the disclosed embodiments may be the ability of the mounting bracket to securely connect to a round or rounded tube using a single bolt.

An example mounting bracket assembly may include a body or structural piece that may be made in whole or in part of a flexible or semi-flexible material. The flexible body may include at least one top member and an angled bottom member may be connected to the top member at opposite ends thereof. The top member and/or bottom member may be made of a flexible or semi-flexible material. The angled bottom member may be fixedly attached to the top member or the body may be a unitary structure made by machining, extrusion, casting, molding, of cast aluminum, extruded aluminum, injection molded plastic, or may be made of steel, fiberglass, composite, or any other strong flexible or semi-flexible material. A network of strengthening members may be provided between the top member and the angled bottom member.

The body may include a ring and the ring may at least partially define a beam insertion aperture between the top member and the bottom member. The beam insertion aperture may be of any size or shape depending on the size and shape of the torsion beam being inserted therethrough, including but not limited to, round, square, hexagonal, octagonal, or any hybrid shape such as rounded with flats on one or more sides. The mounting bracket assembly may be advantageously designed so it has structural material only where necessary and is in the shape and form of the stresses on the assembly.

Embodiments of the present disclosure are explained with reference to the accompanying figures.

With reference to FIGS. 2-5C, example embodiments of a mounting bracket assembly 105 will be described. Disclosed mounting bracket assemblies and methods can be used in a number of different contexts. One such application is in a solar mounting and/or tracking system. FIG. 1 shows an example solar mounting system 100 including at least one support column 20, a torsion beam 30 connected to the support column 20 by a bearing 60, a mounting rack (not shown) attached to the torsion beam 30, and at least one photovoltaic (PV) module 50 mounted via the mounting system 100. An example mounting bracket assembly 105 may be used to mount the PV modules 50 to the torsion beam 30. The torsion beam 30 may be any shape, including but not limited to, round, square, hexagonal, octagonal, or any hybrid shape such as rounded with flats on one or more sides. One of the advantages of the disclosed embodiments is the ability of the mounting bracket to securely connect to a round or rounded tube using a single bolt, the threaded rod discussed herein. As discussed in more detail herein, the mounting bracket assembly 105 defines a beam insertion aperture 170 such that the torsion beam 30 may be disposed therein and run through the aperture 170.

An example mounting bracket assembly 105 may include a body 140 or structural piece that may be made in whole or in part of a flexible or semi-flexible material. The flexible body 140 includes at least one top member 120 and an angled bottom member 130 connected to the top member 120 at opposite ends 125a, 125b thereof. The top member 120 and/or the bottom member 130 may be made of a flexible or semi-flexible material. The angled bottom member 130 may be fixedly attached to the top member 120 or the body 140 may be a unitary structure made by machining, extrusion, casting, molding, of cast aluminum, extruded aluminum, injection molded plastic, or may be made of steel, fiberglass, composite, or any other strong flexible or semi-flexible material. The angle of the bottom member 130 may vary as seen in the embodiments of FIGS. 4A-4C and 5A-5C. A network of strengthening members 190 may be provided between the top member 120 and the angled bottom member 130.

The body 140 includes a ring 180 that defines a beam insertion aperture 170 between the top member 120 and the bottom member 130. The beam insertion aperture may be of any size or shape depending on the size and shape of the torsion beam 30 being inserted therethrough, including but not limited to, round, square, hexagonal, octagonal, or any hybrid shape such as rounded with flats on one or more sides. The size of the ring 180 and the beam insertion aperture 170 may vary depending on the application, as seen in the embodiments of FIGS. 4A-4C and 5A-5C. The mounting bracket assembly 105 is advantageously designed so it has structural material only where necessary and is in the shape and form of the stresses on the assembly.

Figure 6A:
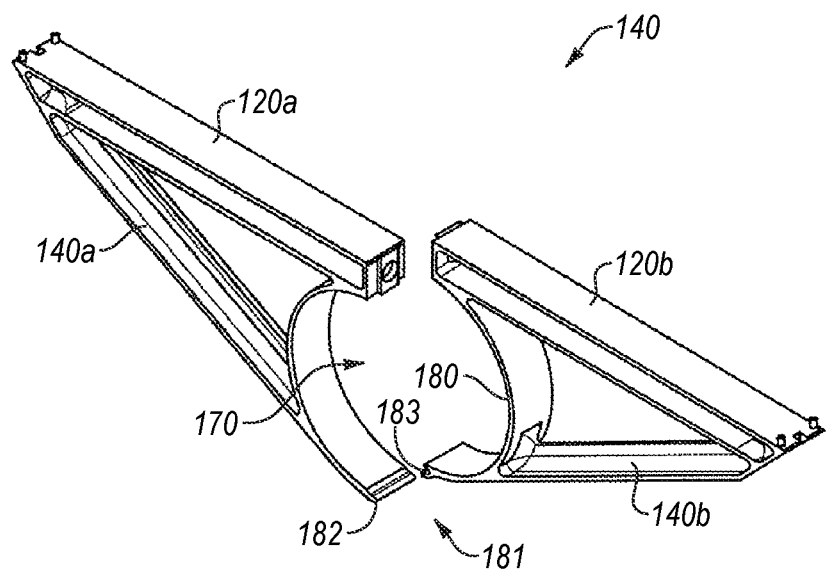
FIG. 6A is a perspective view an example embodiment of a mounting bracket body in accordance with the present disclosure.
Figure 6B:
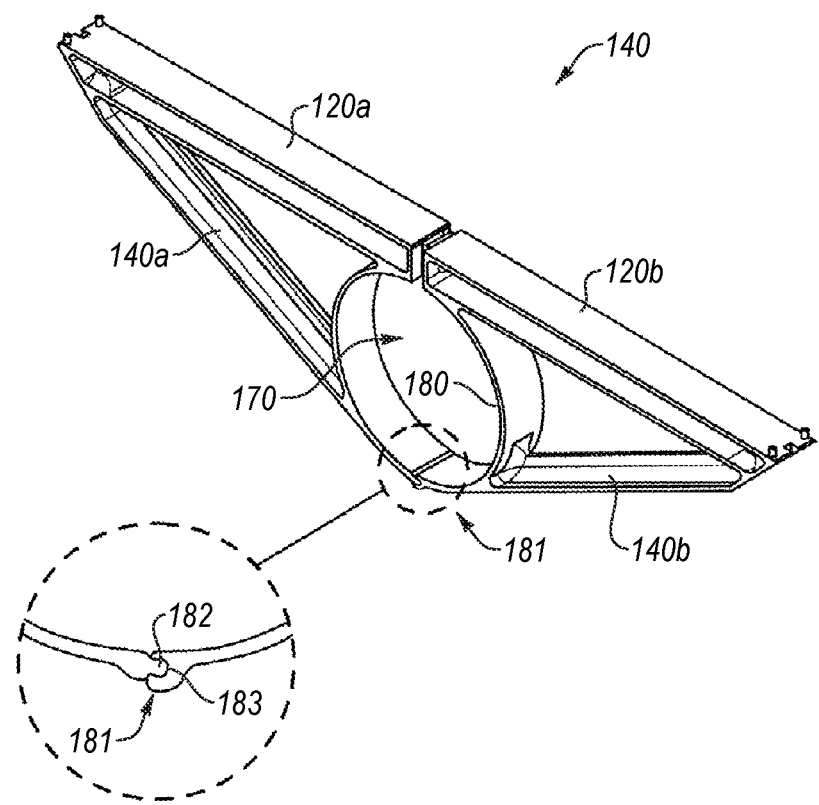
FIG. 6B is a perspective view an example embodiment of a mounting bracket body in accordance with the present disclosure.
Figure 7A:
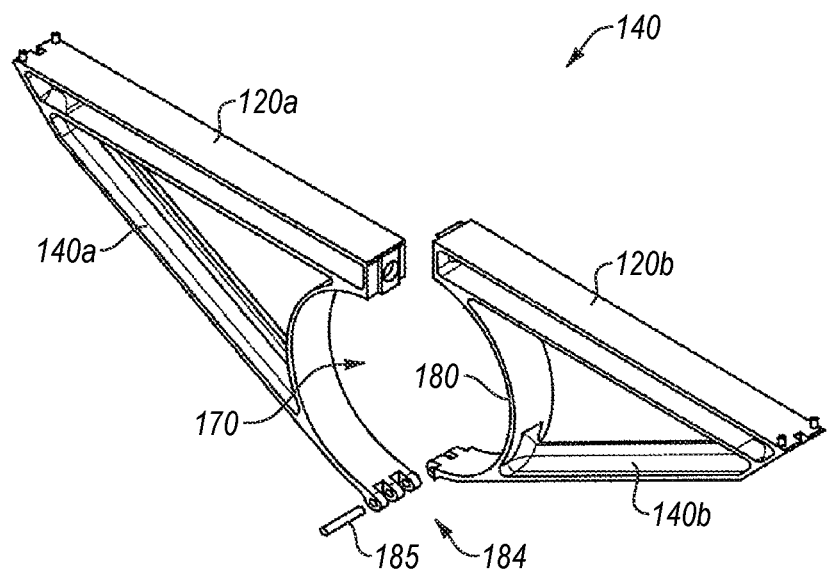
FIG. 7A is a perspective view an example embodiment of a mounting bracket body in accordance with the present disclosure.
Figure 7B:
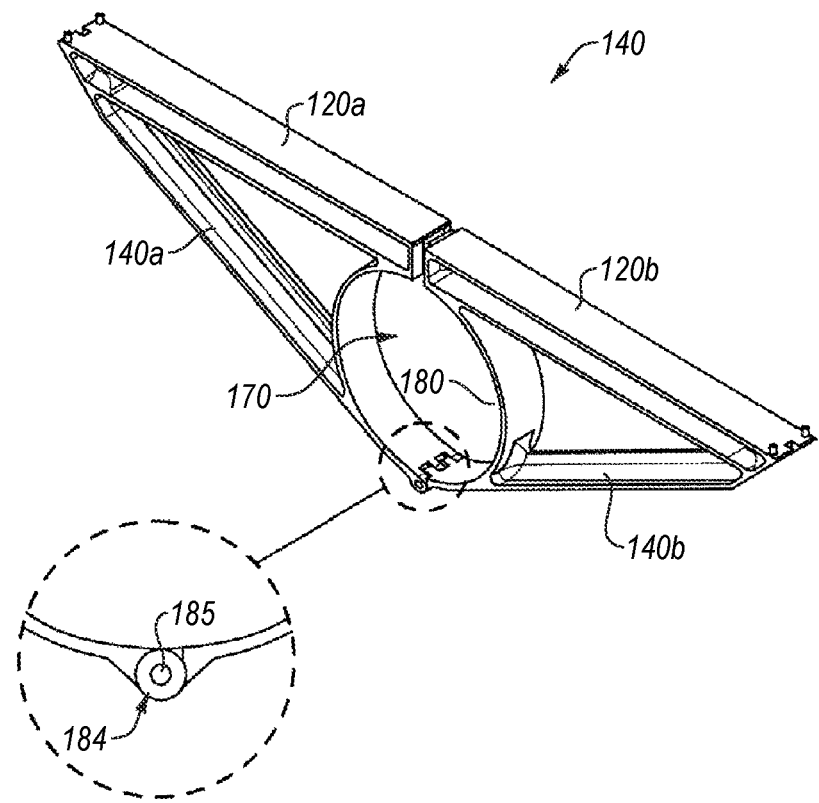
FIG. 7B is a perspective view an example embodiment of a mounting bracket body in accordance with the present disclosure.

In example embodiments, the body 140 of the mounting bracket assembly 105 may include a two-piece construction. FIGS. 6A-B and 7A-B illustrate embodiments in which body 140 comprises two attachable body pieces 140a and 140b. This advantageously facilitates attachment of the mounting bracket assembly 105 to the torsion beam 30. The body pieces 140a, 140b may be joined by a slidable locking mechanism 181 comprising a mating flange 182 and groove 183, as seen in FIGS. 6A and 6B. Alternatively, as shown in FIGS. 7A and 7B, a hinged connection 184 including a hinge pin 185 may be provided.

Figure 8:
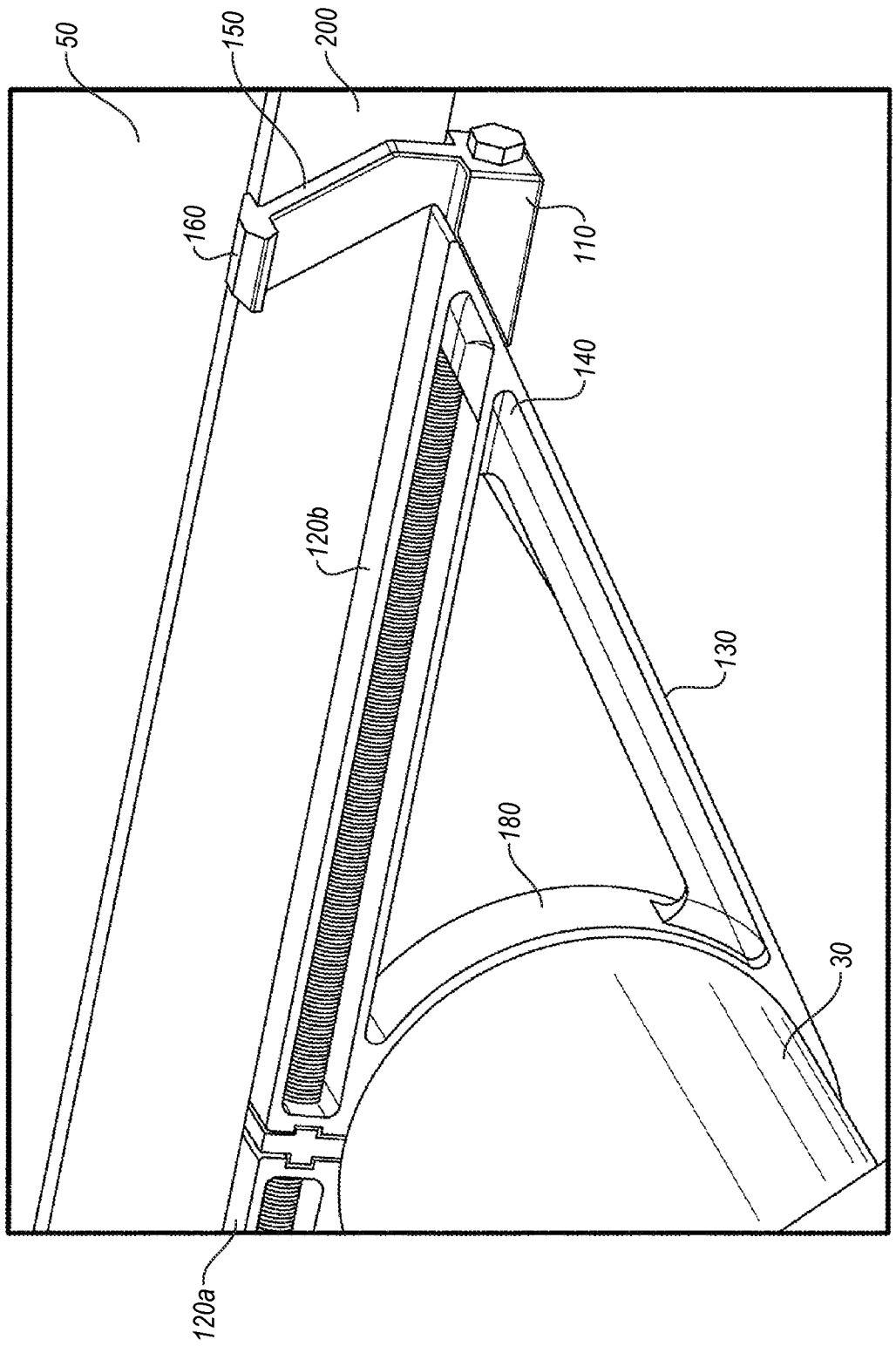
FIG. 8 is a detail perspective view of an example embodiment of a mounting bracket assembly in accordance with the present disclosure.
Figure 9:
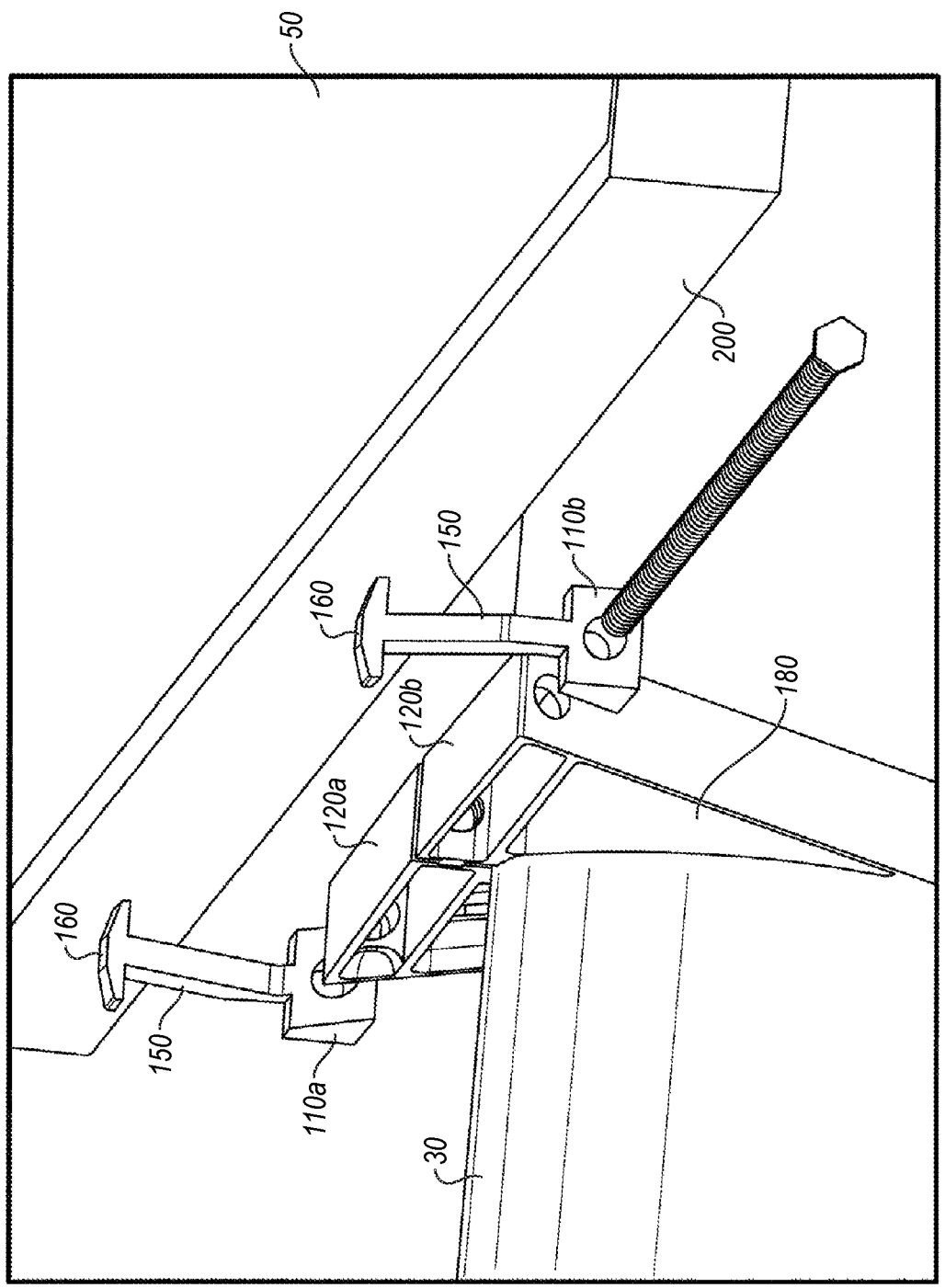
FIG. 9 is an exploded view of an example embodiment of a mounting bracket assembly in accordance with the present disclosure.

As best seen in FIGS. 8 and 9, at least one clamp 110 is attached to an end 125a, 125b of the top member 120 and in example embodiments, a first clamp 110a is attached a first end 125a of the top member 120 and a second clamp 110b is attached to the second end 125b of the top member 120. An example clamp 110 has an arm 150 and a flange 160. As discussed in detail herein, the arm 150 and flange 160 of the clamps 110 serve to attach to the top or side of a frame 200 of a PV module 50 to hold the PV module in place. Clamps 110 may also be compression style securing the PV module 50 by compression or using hooks to attach to the sides of the PV module 50. The mounting bracket assembly 105 and clamps 110 may vary in length for different module designs and load requirements. Clamps 110 may also define an additional hole for driving a screw or other fastener through the clamp and a cutout in the frame 200 to further secure the PV module 50.

Figure 10A:
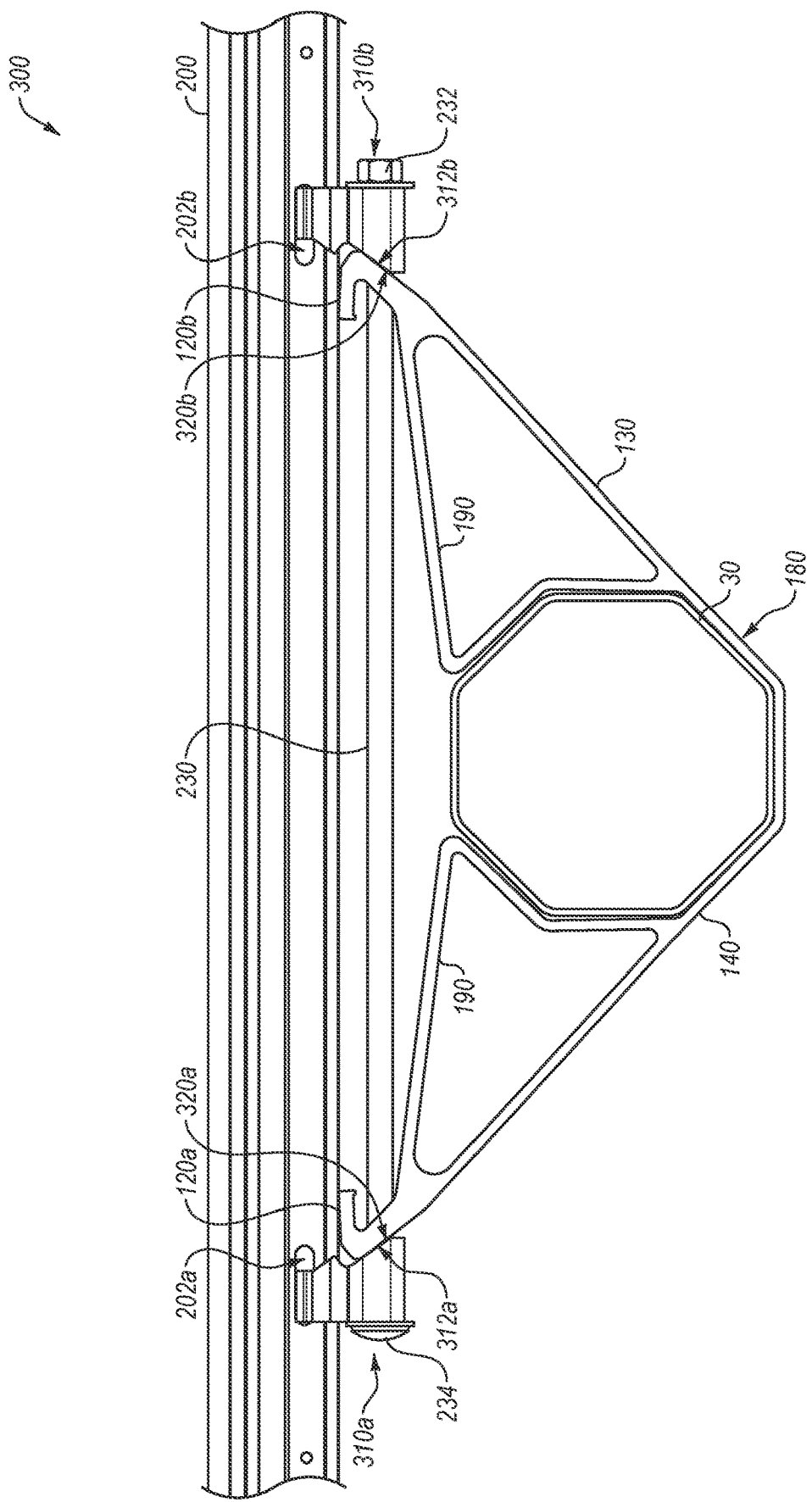
FIGS. 10A-10B illustrate another example embodiment of a mounting bracket assembly in accordance with the present disclosure.
Figure 10B:
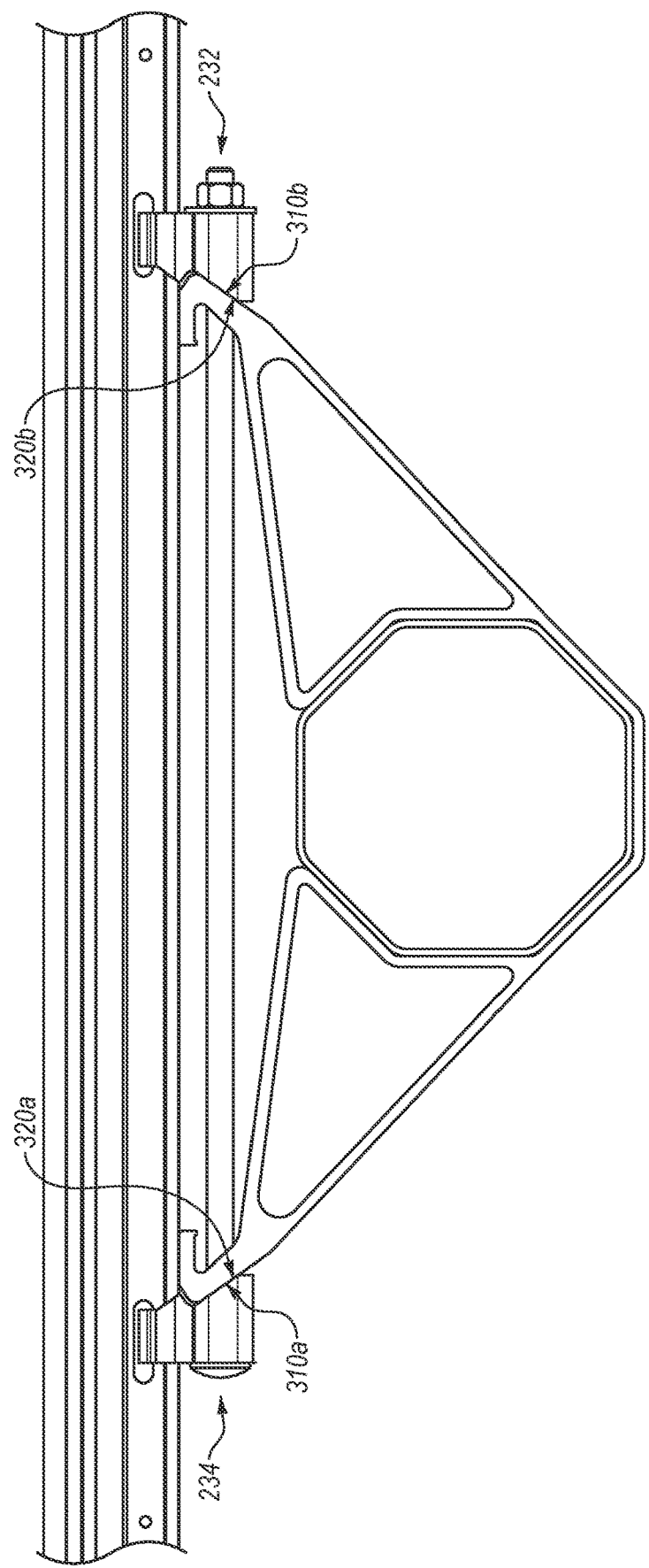
Figure 11A:
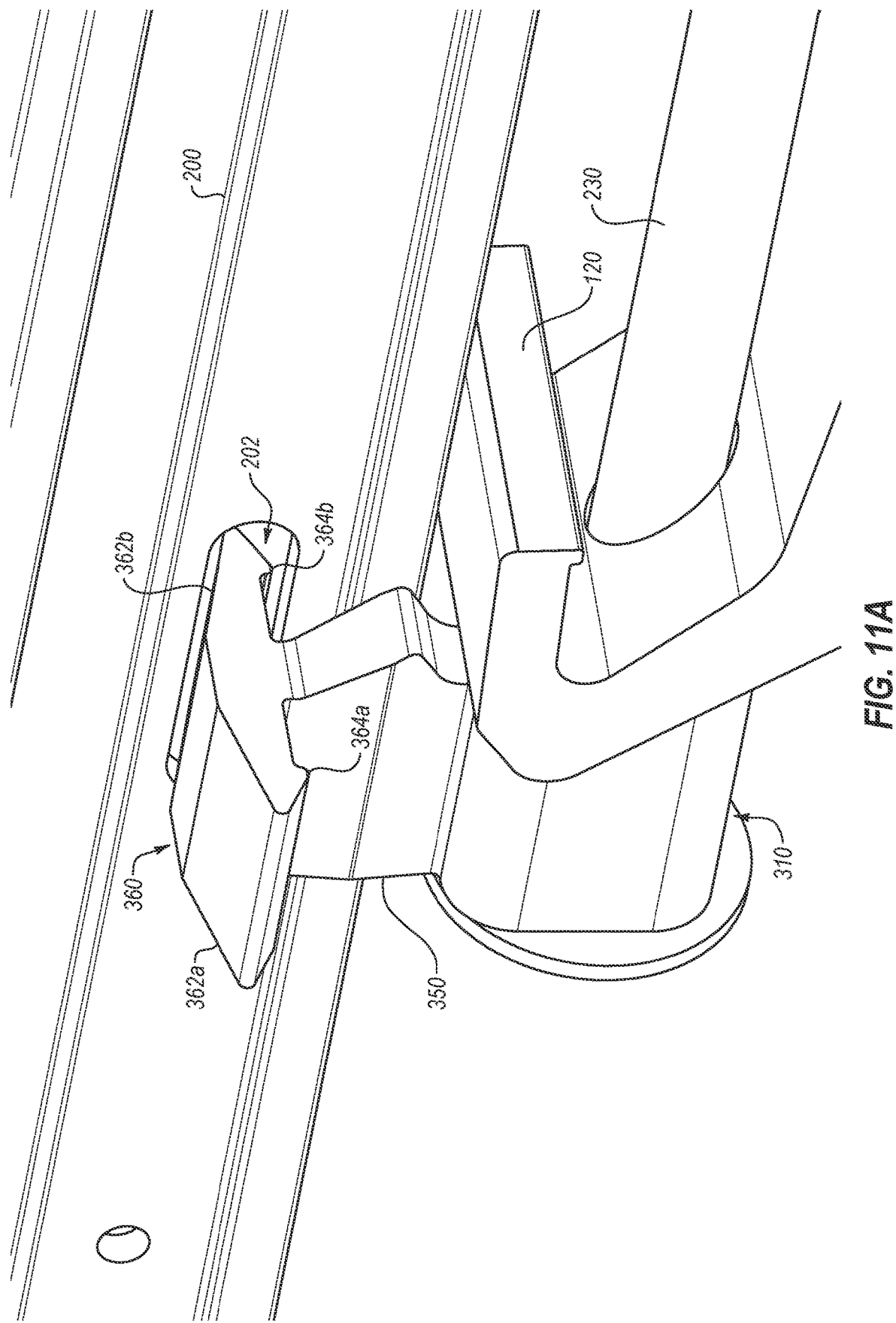
Figure 12A:
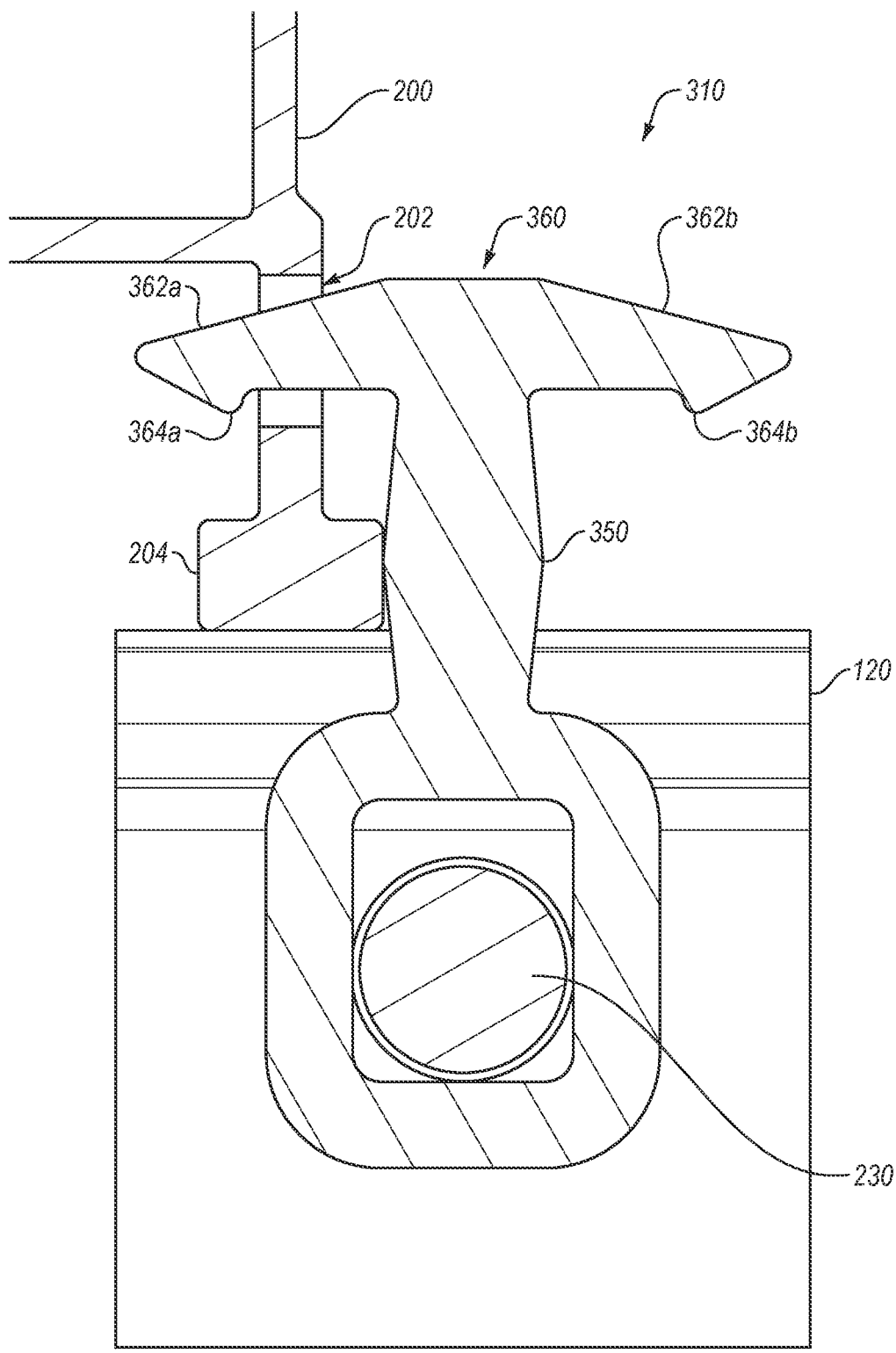
FIGS. 12A-12B illustrate a cut-away view of operation of an example mounting bracket assembly in accordance with the present disclosure.
Figure 12B:
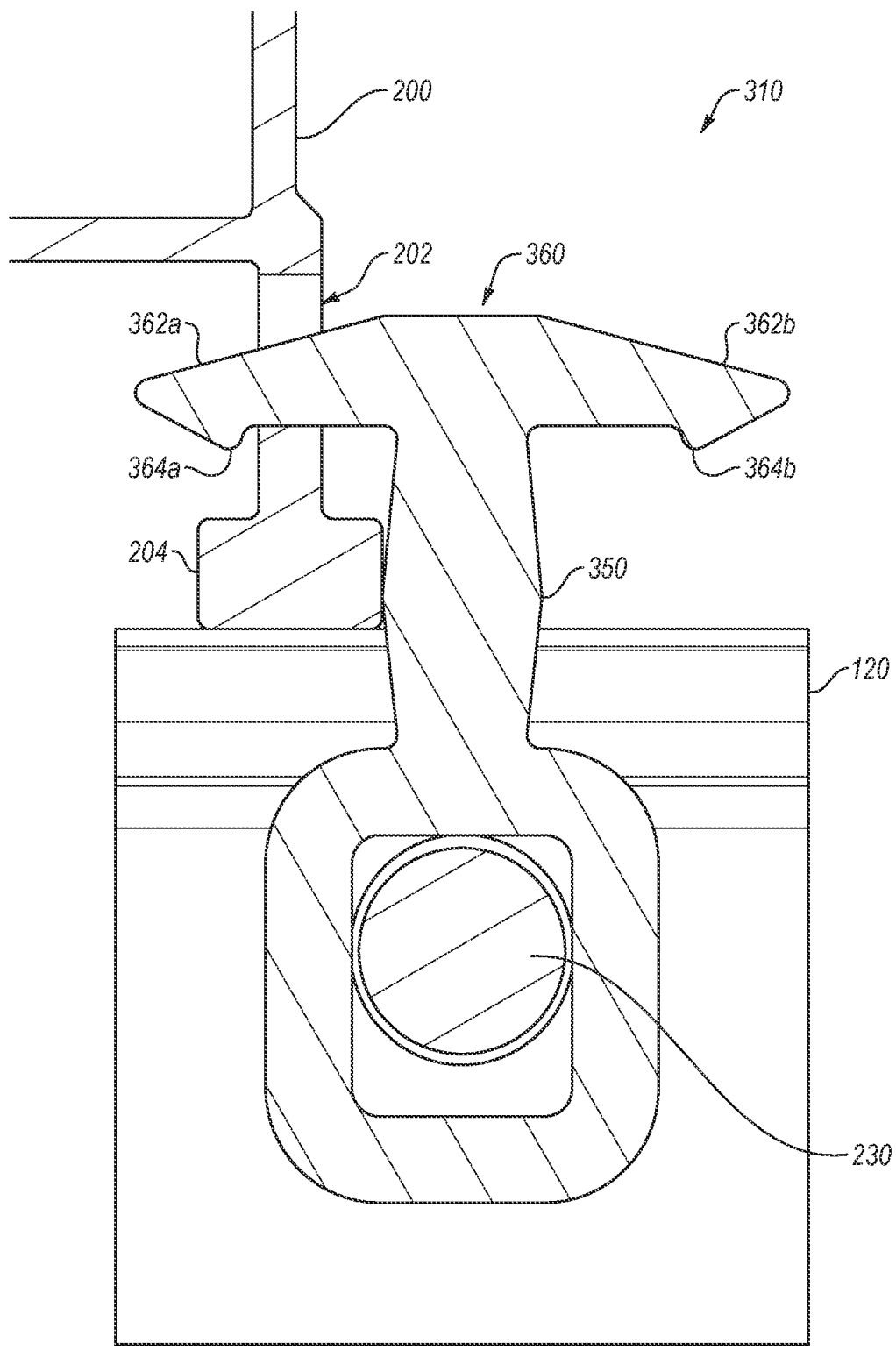

FIGS. 10A-12B illustrate various embodiments of another example clamp 310. FIGS. 10A and 10B illustrate a side view of a mounting bracket assembly 105 utilizing the clamps 310a, 310b at either end of the mounting bracket assembly 300. FIG. 10A illustrates a loose configuration and FIG. 10B illustrates the clamps 310a, 310b tightened to a frame 200. FIGS. 11A and 11B illustrate a close-up isometric view of the clamp 310. FIG. 11A illustrates a loose configuration and FIG. 11B illustrates the clamps 310a, 310b tightened to the frame 200. FIGS. 12A and 12B illustrate a cut-away view of the clamp 310. FIG. 12A illustrates a loose configuration and FIG. 12B illustrates the clamp 310 tightened to the frame 200. FIGS. 10A-12B are numbered with same numbers for similar or comparable components to those illustrated and described with reference to FIGS. 1-9. For example, FIGS. 10A and 10B illustrate a torsion beam 30, a mounting bracket assembly 300, a body 140, top members 120a/120b, bottom member 130, strengthening members 190, a ring 180, etc.

As illustrated in FIGS. 10A and 10B, the clamp 310 may include sloping surfaces 312 that interface with sloping surfaces 320 of the top members 120. For example, the sloping surface 312a of the clamp 310a may be shaped to have a similar incline to that of the sloping surface 320a. Through the use of the sloping surfaces 312 and 320, the clamps 310 may be drawn in a direction that follows the sloping surfaces 312 and 320. By doing so, the clamp 310 relative to the top member 120 is moved downwards and inwards (e.g., towards the torsion beam 30 in a direction with both a vertical and horizontal component). This can be observed in a comparison of FIG. 10A relative to FIG. 10B.

In particular, as a single bolt 230 of the mounting bracket assembly 105 is tightened, the head 234 and nut 232 are moved closer to each other along the length of the single bolt 230. As the head 234 moves closer to the nut 232, the head 234 forces the clamp 310a to progress along the sloping surface 320a because of the interface between the sloping surface 312a and the sloping surface 320a. Similarly, as the nut 232 moves closer to the head 234, the nut 232 forces the clamp 310b to progress along the sloping surface 320b because of the interface between the sloping surface 312b and the sloping surface 320b. As the single bolt 230 is tightened, the clamps 310a and 310b are drawn towards the torsion beam 30 in both vertical and horizontal components. Based on the vertical component (e.g., the direction perpendicular to the single bolt 230), the clamps 310 are drawn downwards to pinch the frame 200 between the clamps 310 and the top member 120. Doing so mounts the PV modules attached to the frame 200 securely to the torsion beam 30 and the mounting bracket assembly 105 such that the PV modules may be oriented, moved, or otherwise adjusted using the torsion beam 30.

In some embodiments, the clamp 310 may include a stop or other feature at an end of the sloping surface 312 to limit how far the clamp 310 may be drawn towards the torsion beam 30. Additionally or alternatively, the clamp 310 may include a flat or a substantially flat profile at the end of the sloping surface as shown in FIGS. 13C and 13D.

In some embodiments, tightening the single bolt 230 additionally causes the mounting bracket assembly 105 to be tightened, locked, or otherwise coupled to the torsion beam 30. For example, as illustrated in FIGS. 10A and 10B, as the single bolt 230 is tightened, the ring 180 is tightened as the top members 120a and 120b are forced towards each other. Because of the shape of the mounting bracket assembly 105, the mounting bracket assembly 105 is able to flex, bend, or fold to more tightly wrap around the torsion beam 30. Such flexion may be based on deformation of a solid piece of material (such as illustrated in FIGS. 2-5 and FIGS. 8-9) or a flanged/hinged embodiment (such as illustrated in FIGS. 6A-7B). In some embodiments, both the tightening of the ring 180 around the torsion beam 30 and the pinching of the frame 200 between the clamps 310 and the top members 120 may occur simultaneously upon the tightening of the single bolt 230. For example, the forces at the sloping surfaces 312 and 320 may cause a given clamp 310 to move downwards while also drawing the top members 120 closer together. In some embodiments, the tightening of the clamp 310 to the frame 200 and the tightening of the ring 180 around the torsion beam 30 may occur in phases. For example, the single bolt 230 may be tightened, drawing the clamps 310 down to pinch the frame 200 between the clamp 310 and the top members 120 until the top member 120 reaches the stop or limiter of the clamp 310. After the stop or limiter is reached, the top members 120 may be forced closer together laterally along the single bolt 230 as the single bolt 230 is further tightened to tighten the ring 180. In some embodiments, the clamp 310 may or may not include the stop or limiter and have a flat or a substantially flat profile. In embodiments without the stop or limiter, movement of the clamp 310 along the sloping surfaces 312 may be stopped by a flange and/or a tab of the clamp 310 interfacing with an edge of the opening 202 (such as openings 202a and 202b). Additionally or alternatively, movement of the clamp 310 along the sloping surfaces 312 may be stopped by the bolt 230 interfacing with an interior surface of the head 234.

The frame 200 may include one or more openings 202 within which the clamps 310 may operate to pinch the frame 200 between the clamp 310 and the top member 120. For example, the clamp 310a may protrude through the opening 202a, and when the single bolt 230 is tightened, the clamp 310a may be forced against a bottom edge of the opening 202a. The openings 202 may be of a length and width sized to accommodate both the horizontal and vertical components of the movement of the clamp 310 relative to the top member 120. For example, the opening 202 may be sized such that the clamp 310 may be placed within the opening 202 and the single bolt 230 tightened to draw the clamp 310 against the bottom edge of the opening 202 without running into a side edge of the opening 202.

FIGS. 11A and 11B illustrate a loose configuration of the clamp 310, and the clamp 310 tightened to the frame 200, respectively. As illustrated in FIG. 11A, the clamp 310 may include an arm 350 extending away from the top member and towards a flange 360. The flange 360 may be comprised of two ears 362 (such as the ears 362a and 362b) projecting outwards from a top of the arm 350. The ears 362 may include tabs 364 extending downwards from the ears 362.

As illustrated in FIGS. 11A and 11B, when installing the clamp 310, the flange 360 may be inserted in the opening 202 by positioning the top member 120 proximate the frame 200 and moving the ear 362b into the opening 202. The ear 362b may be tapered along a top edge sloping from the top of the arm 350 downward towards the end of the ear 362b. The ear 362b may also be sloped from the end of the ear 362b back towards the tab 364b. In this manner, the ear 362b may have a pointed shape to facilitate inserting the ear 362b into the opening 202. Additionally or alternatively, the ear 362b may have a rounded shape and/or the flange 360 may have a curved profile.

Similar to the manner described with reference to FIGS. 10A and 10B, as the single bolt 230 is tightened with the ear 362b disposed within the opening 202, the clamp 310 is drawn downwards against the bottom surface of the opening 202, pinching the frame 200 between the ear 362b and the top member 120.

In some embodiments, each of the ears 362a and 362b may interact with two separate frames 200. For example, adjacent and parallel PV modules 50 and/or their associated frames 200 may interact with the two ears 362a and 362b of the flange 360.

FIGS. 12A and 12B illustrate a cut-away view of a loose configuration of the clamp 310, and the clamp 310 tightened to the frame 200, respectively.

As illustrated in FIGS. 12A and 12B, as the clamp 310 is tightened down to pinch the frame 200 between the flange 360 and the top member 120, the tabs 364 may align the frame 200 to the clamp 310, and by extension the torsion beam 30. For example, the tab 364a may force the bottom surface of the opening 202 to be oriented perpendicular to the direction the ear 362a projects away from the arm 350. In this manner, by orienting the torsion beam 30 in a North/South direction, the PV modules 50 may be aligned along an East/West direction because the tabs 364 prevent lateral movement or rotation of the frame 200 where the frame 200 interfaces with the clamp 310.

In some embodiments, the arm 350 may also facilitate the alignment of the frame 200 relative to the clamp 310. For example, the frame 200 may include a base 204. The clamp 310 may be shaped such that the distance between an inside edge of the tab 364a and a wide portion of the arm 350 may correspond to a width of the opening 202 and a portion of the base 204 extending beyond the width of the opening 202. In these and other embodiments, the cooperative interference of the tab 364a with the bottom surface of the opening 202 and the base 204 with the wide portion of the arm 350 may work in combination to align the frame 200 relative to the clamp 310. While a certain width of the arm 350 is shown, any width is contemplated that may correspond to the frame 200 and/or an associated base 204 thereof. For example, a narrower base 204 may correspond to a wider arm 350, and vice versa. As another example, both the base 204 and the arm 350 may have flat or substantially flat profiles such that the arm 350 has a constant or a substantially constant width along the length of the arm 350.

Figure 13B:
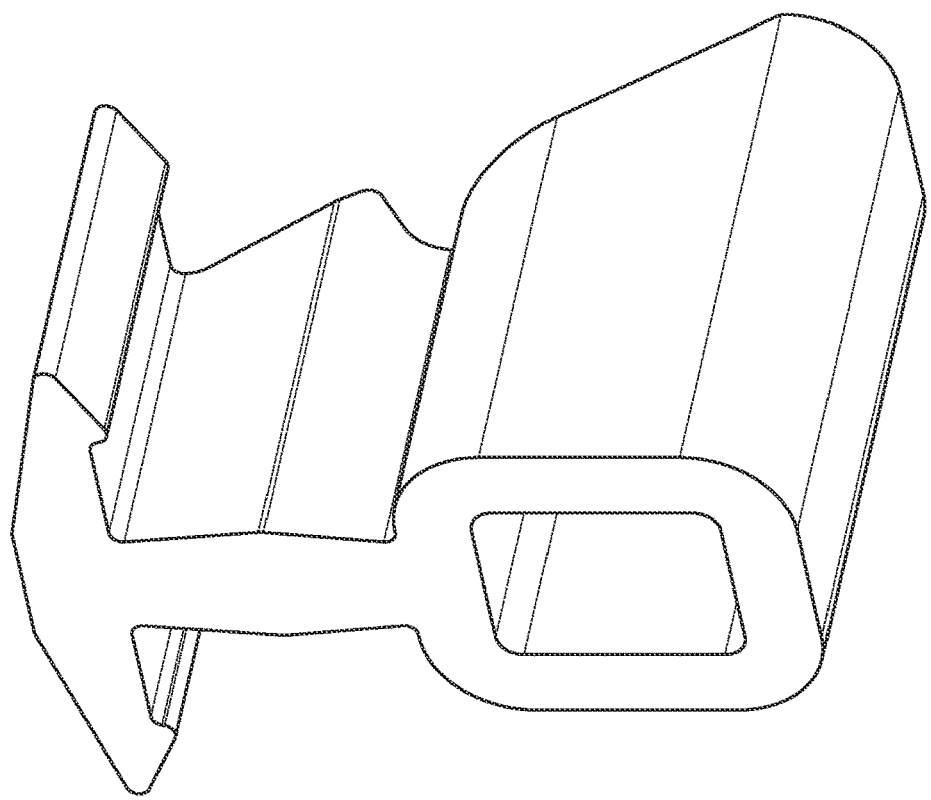
FIGS. 13A-13D illustrate isometric views of an example clamp in accordance with the present disclosure.
Figure 13A:
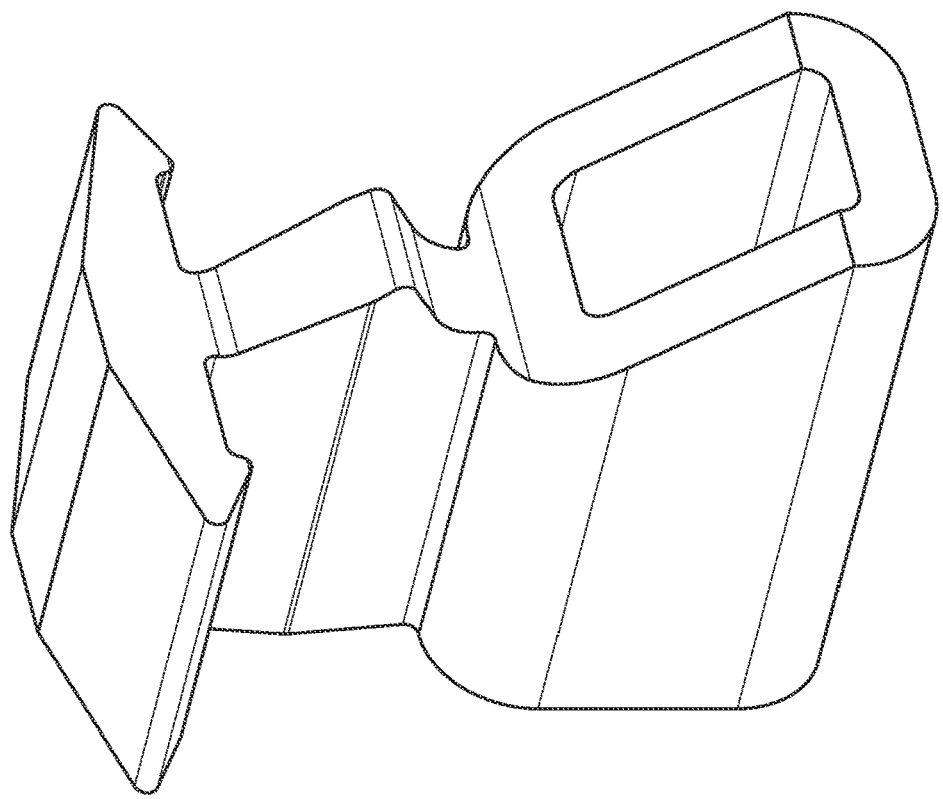
Figure 13D:
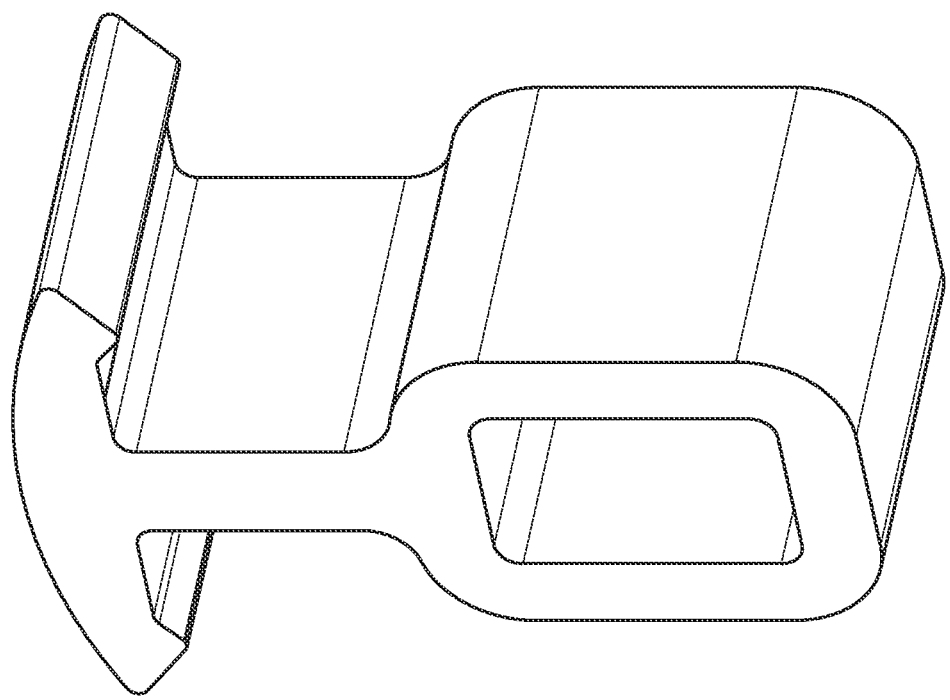
Figure 13C:
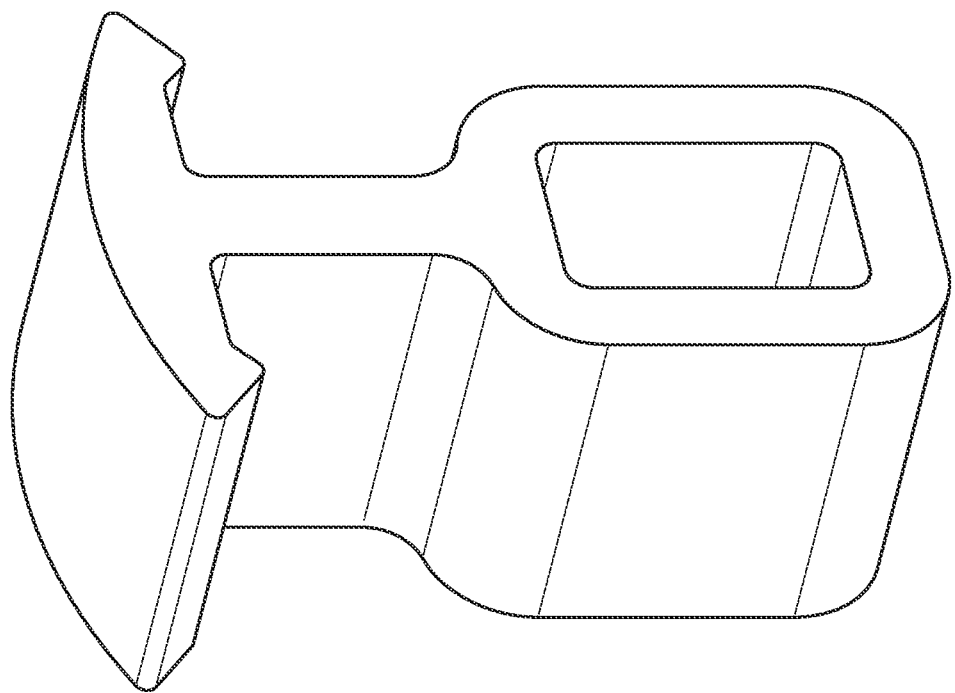

FIGS. 13A and 13B illustrate isometric views of the clamp 310 from different directions. FIGS. 13C and 13D illustrate isometric views of another example clamp 311 from different directions.

As can be seen in FIGS. 13A and 13B, in some embodiments, one face may be flat while the other may be sloped, with a protrusion that acts as a stop or limiter on the amount of travel between the sloping surfaces of the clamp 310 and the top member 120.

As can be seen in FIGS. 13C and 13D, in some embodiments, both faces may be flat. Additionally or alternatively, one face may be flat while the other may be sloped, or all of the faces may be flat without any of the faces being sloped. Additionally or alternatively, the top of the flange may be curved.

FIGS. 14A-14F illustrate various embodiments of profiles of the flange 360 of the clamp 310. For example, the tabs 364 may be larger or smaller than those illustrated in FIGS. 11A-12B, have a different shape, etc. For example, the profile of the flange 360 of the clamp 310 may be flat, substantially flat, sloped with straight edges, sloped with a curved edge, etc.

Figure 14C:
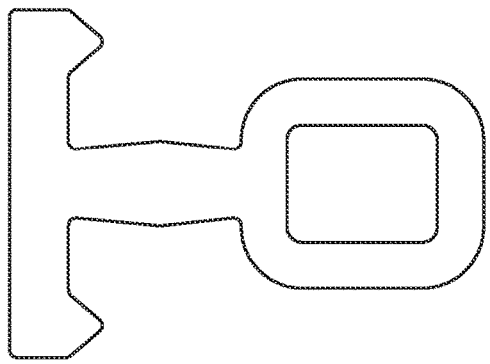
FIGS. 14A-14F illustrate various profiles of example embodiments of a clamp in accordance with the present disclosure.
Figure 14F:
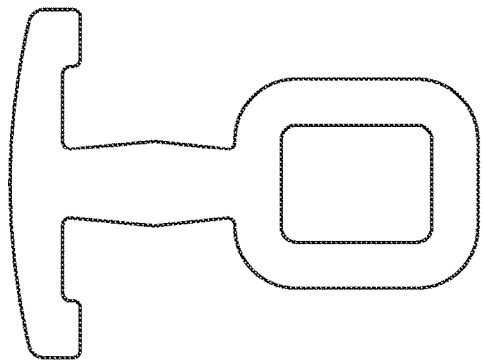
Figure 14B:
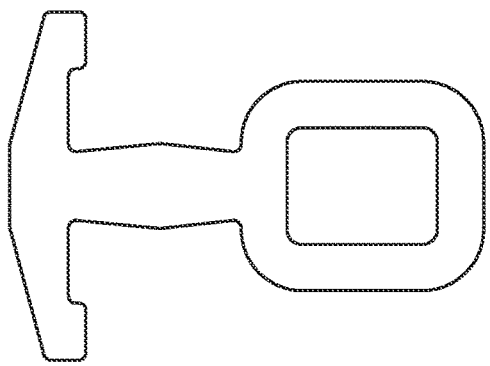
Figure 14E:
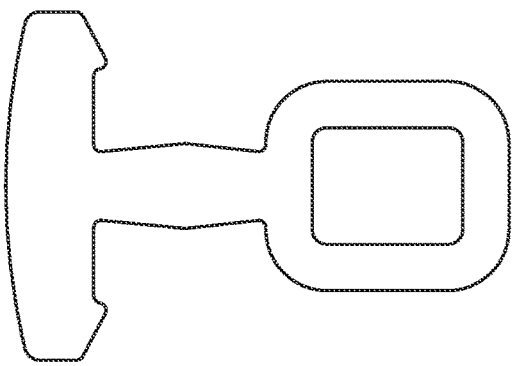
Figure 14A:
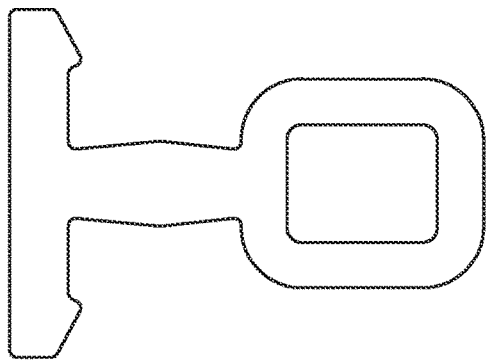
Figure 14D:
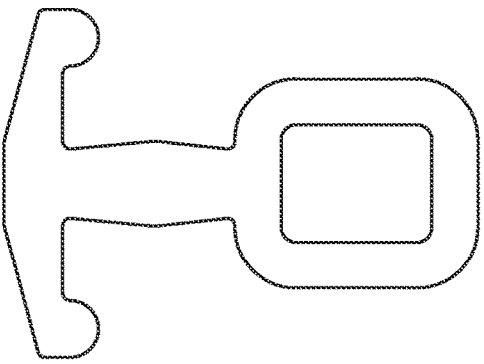

As illustrated in FIG. 14A, in some embodiments, the top surface of the flange 360 may be flat (or may be stepped, tapered, or curved). The tabs 364 may be smaller but still sloped towards the end of the ears 362. As illustrated in FIG. 14B, the tabs 364 may be smaller and may include right-angled edges rather than sloped edges. As illustrated in FIG. 14C, the tabs 364 may be larger with similar slope leading towards the end of the ears 362 as leading back towards the arm 350. As illustrated in FIG. 14D, the tabs 364 may be rounded. As illustrated in FIG. 14E, the top surface may be curved rather than flat or sloped edges. As illustrated in FIG. 14F, the flange may be lower towards the base of the arm.

As illustrated by the variety in FIGS. 14A-14F, the present disclosure contemplates any combination or variation in the tab and/or flange shapes. In these and other embodiments, the shape and/or size may be selected to facilitate consistent orientation of the frame relative to the mounting bracket assembly 300.

Figure 15:
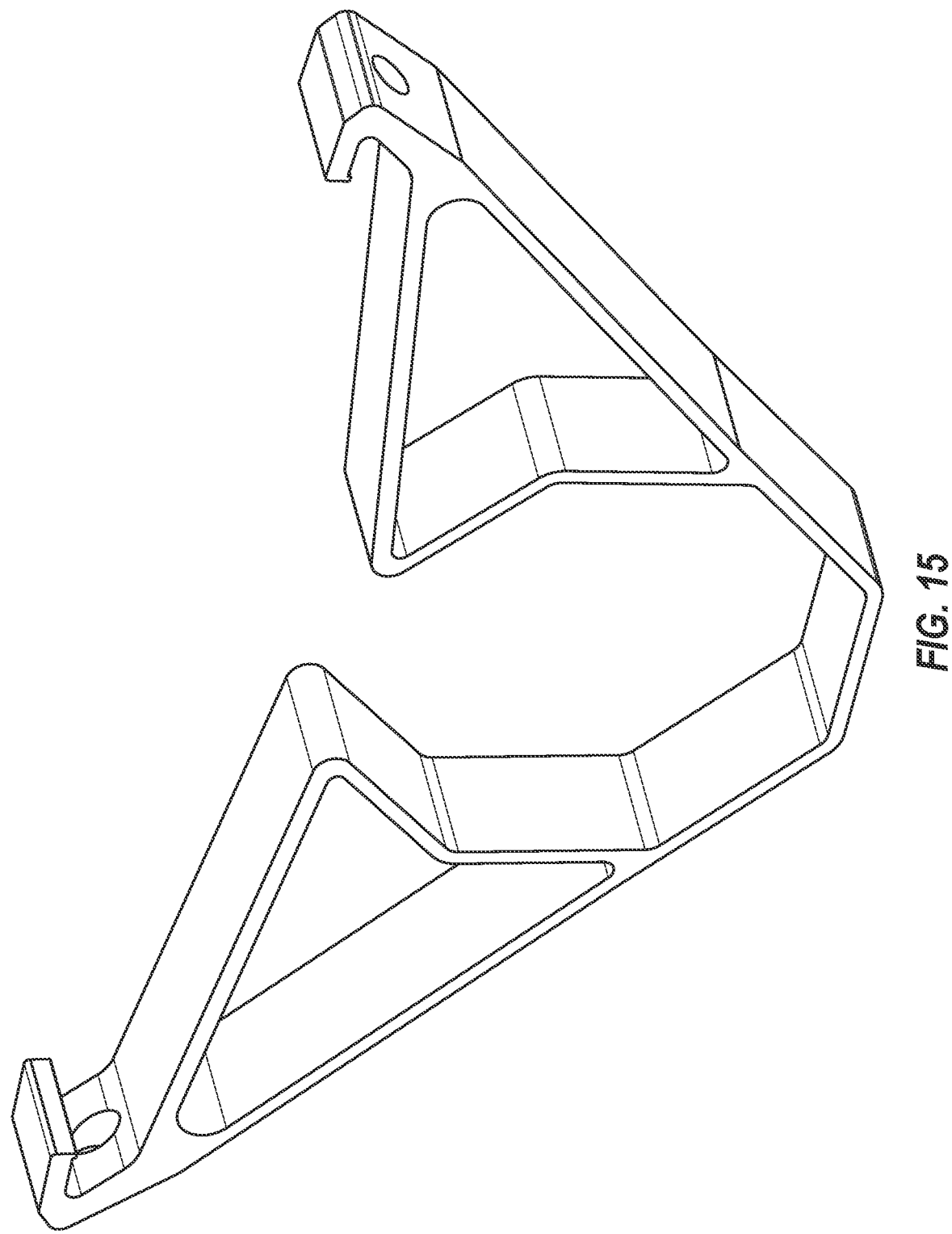
FIG. 15 illustrates an example view of a mounting bracket body in accordance with the present disclosure.

FIG. 15 illustrates an example of a mounting bracket body. For example, the mounting bracket body may be similar or comparable to the body 140 of FIGS. 10A-14B.

FIG. 16 illustrates another example embodiment of a clamp 410, in accordance with the present disclosure. The clamp 410 may operate in a similar or comparable manner to the clamp 310 of FIGS. 10A-14F. As illustrated in FIG. 16, any component, feature, or methodology may be used to tighten the clamp 410 down to pinch a bottom surface of an opening 202 and is not limited to using the sloping surfaces illustrated and discussed herein. For example, a mounting beam 420 may be bolted or otherwise fixedly coupled to a torsion beam (not shown). The mounting beam 420 may have the clamp 410 attached thereto via an attachment that permits the clamp 410 to be raised or lowered relative to the mounting beam 420 (e.g., by a threaded connection, bolts, etc. that are able to tighten the clamp 410 against the mounting beam 420).

In operation, with the clamp 410 coupled to the mounting beam 420 but not tightened thereto, an ear 462 of a flange 460 of the clamp 410 may be inserted through the opening 202. The clamp 410 may then be tightened against the mounting beam 420. For example, nuts, wing nuts, screws, etc. may be tightened to draw the clamp 410 closer to the mounting beam 420. As the clamp 410 is tightened to the mounting beam 420, the ear 462 may engage with a bottom surface of the opening 202 to fixedly couple the frame 200 in position relative to the mounting beam 420.

In some embodiments, a tab 464 of the ear 462 may align the frame 200 relative to the clamp 410, the mounting beam 420, and torsion beam 30. For example, the ear 462 may engage with a bottom surface of the opening 202 and the tab 464 may force the clamp 410 and the opening 202 to be oriented in a desired manner as described herein. By doing so, the frame 200 may be pinched between the clamp 410 and the mounting beam 420 with the tab 464 overhanging the opening 202, such that the frame 200 and any associated PV modules 50 may be fixedly coupled to the torsion beam 30 via the clamp 410 and the mounting beam 420. In this manner, by orienting the torsion beam 30 in a North/South direction, the PV modules associated with the frame 200 may be aligned along an East/West direction because the tab 464 prevents a North/South movement or rotation of the frame 200 where the opening 202 of the frame 200 interfaces with the ear 462 of the clamp 410. Additionally or alternatively, the interface between the ear 462 of the clamp 410 and the opening 202 of the frame 200 may align the PV modules in the East/West direction. By aligning the PV modules in the East/West direction, proper solar tracking by the PV modules may be obtained.

In some embodiments, the clamp 410 may be inserted into the opening 202 prior to being coupled to the mounting beam 420.

The clamp 410 may include any profile with ears 462 and/or tabs 464, such as the profiles illustrated in FIGS. 14A-14F and/or variations thereof.

Modified Clamp and Frame Openings

Figure 17B:
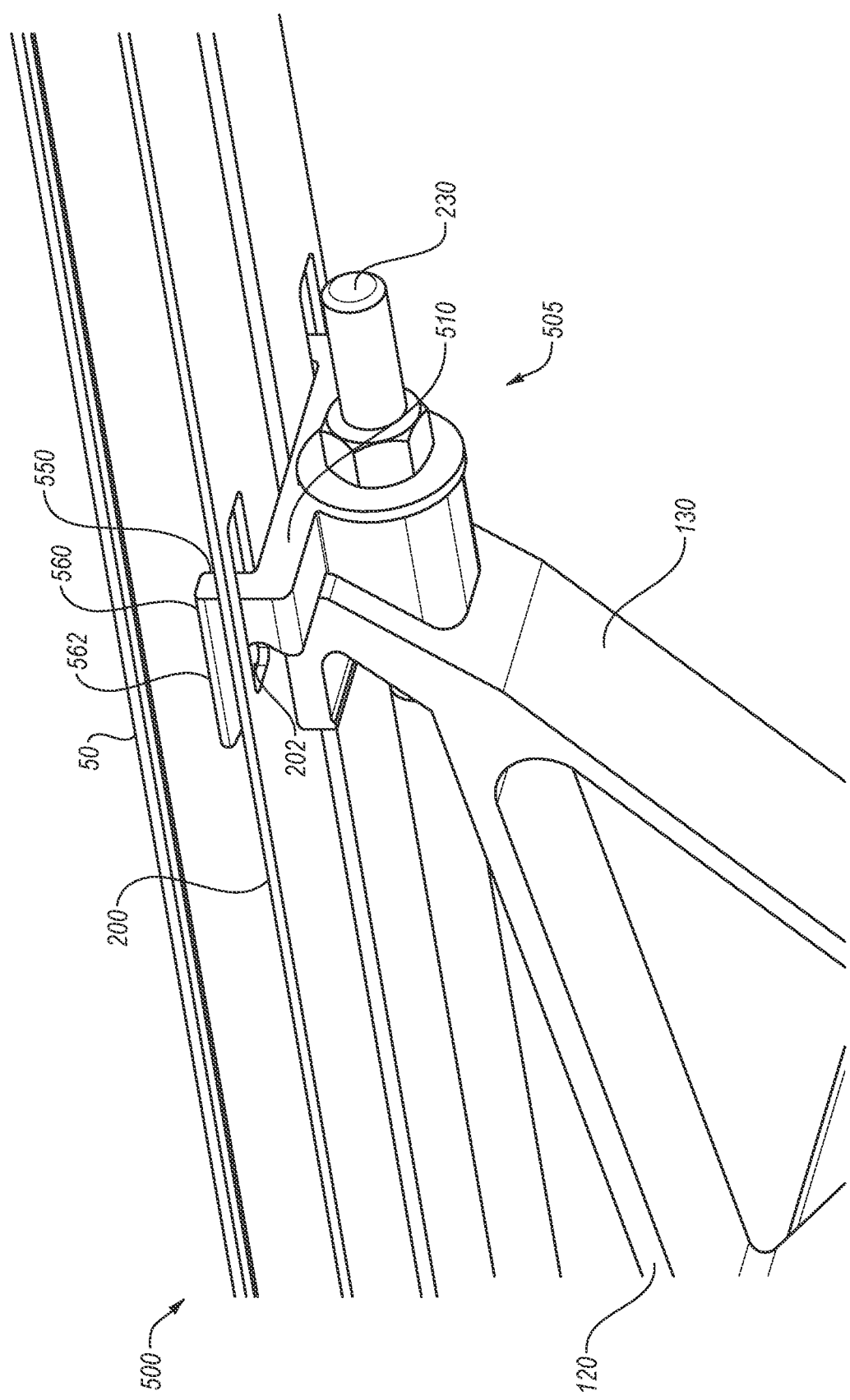

FIG. 17A is a perspective view of an example embodiment of a mounting system 500 and mounting bracket assembly 505 in accordance with the present disclosure. FIG. 17B illustrates the same perspective view of the mounting system 500 and the mounting bracket assembly 505 in which a clamp 510 is tightened to the frame 200. As illustrated in FIGS. 17A and 17B, clamps such as the clamp 510 may be positioned at either end of the mounting bracket assembly 505. The clamp 510 may include an arm 550 extending away from the mounting bracket assembly 505 and ending in a flange 560. The flange 560 may include ears 562 extending away from the arm 550. The mounting bracket assembly 505 and the clamp 510 may operate to clamp against a PV module 50 and its associated frame 200.

In some embodiments, the clamp 510 may include a sloping surface that may interface with a sloping surface of the top member. Through the use of the sloping surfaces, the clamp 510 may be drawn in a direction that follows the sloping surfaces. By doing so, the clamp 510 may be moved relative to the top member downwards and inwards (e.g., towards the frame 200 in a direction with both a vertical and horizontal component). In some embodiments, a bolt 230 may pass through the mounting bracket assembly 505 and the clamp 510. The tightening of the bolt 230 may cause the clamp to move relative to the mounting bracket assembly 505 due to the sloping surface.

In these and other embodiments, the frame 200 may include an opening or slot such as the opening 202. As the bolt 230 is tightened, the clamp 510 may be shaped and positioned such that the ear 562 may align with and go into the opening 202. By engaging with the opening 202 and clamping the frame 200 between the clamp 510 and a top surface of the mounting bracket assembly 505, the frame 200 may be locked into place relative to the mounting bracket assembly 505 and the clamp 510. Additionally, by using multiple clamps and multiple openings, the frame 200 may be aligned in a straightforward, repeatable, and cost-effective manner.

In some embodiments, such as illustrated in FIGS. 17A and 17B, the frame 200 may include an opening along a bottom surface of the frame 200, such as illustrated as the opening 202. Additionally or alternatively, the frame 200 may include a protrusion extending outward from a top surface of the frame 200. For example, the frame 200 may include a profile similar or comparable to an I-beam, and the opening may be positioned along a top arm of the I-beam shape (such as the opening 202) or the opening may be positioned along the bottom arm of the I-beam shape (such as the opening 202).

Depending on the location of the opening 202 and/or the desired location for clamping the frame 200 via the mounting system 500, the length of the arm 550 may be different. For example, as illustrated in FIGS. 17A and 17B, the arm 550 may be long enough that the ear 562 may align with the opening 202 on the top surface of the frame 200.

Modifications, additions, or omissions may be made to the mounting bracket assembly 505 without departing from the scope of the present disclosure. For example, the designations of different elements in the manner described is meant to help explain concepts described herein and is not limiting. Further, the mounting bracket assembly 505 may include any number of other elements or may be implemented within other systems or contexts than those described.

Figure 18A:
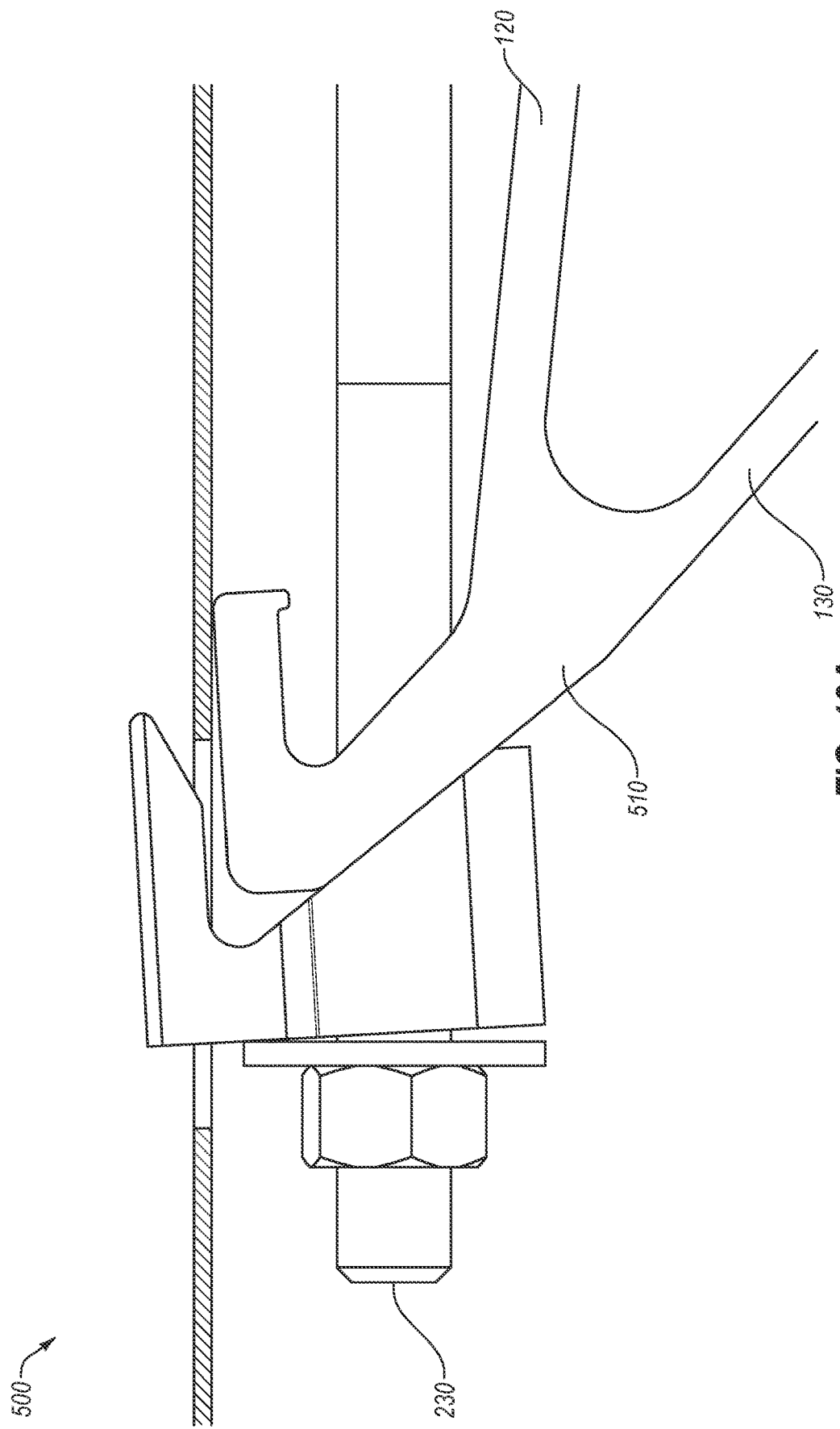

FIG. 18A is a close-up side view of the system 500 and mounting bracket assembly 505 in accordance with the present disclosure. FIG. 18B is a close-up perspective view of the system 500 and mounting bracket assembly 505 in which the clamp 510 is tightened to the frame 200 in accordance with the present disclosure. The mounting system 500 includes a clamp 510 that may be similar or comparable to the clamp 110 of FIGS. 1A and 1B. For example, the clamp 510 may include the arm 550, the flange 560, and the ear 562. Additionally, the mounting system 500 may include the frame 200 as described in relation to the frame 200 of FIGS. 17A and 17B.

The arm 550 of the clamp 510 may be shorter than the arm 550 illustrated in FIGS. 17A and 17B because the frame 200 includes an opening 202 along the bottom surface of the frame 200 rather than the top surface of the frame 200 of FIGS. 17A and 17B. Using the shorter arm 550, the ear 562 may be positioned to interface with the opening 202. In some embodiments, by providing a shorter arm 550, the clamp 510 may use less material and that material may be under less mechanical stress as compared to the arm 550 of FIGS. 17A and 17B.

In these and other embodiments, the clamp 510 of FIGS. 18A and 18B may operate in a similar manner to the clamp 510 of FIGS. 17A and 17B. The sloping surface of the clamp 510 may interface with a sloping surface of the mounting bracket assembly 505 such that as the single bolt 230 is tightened, the clamp 510 may be moved downward relative to the mounting bracket assembly 505, effectively clamping the frame 200 between the ear 562 and the top surface of the mounting bracket assembly 505.

In some embodiments, a profile of the flange 560 of the clamp 510 may be selected to be operable with multiple potential locations of openings. For example, the same profile of flange 560 may be operable for the opening 202 along the bottom surface of the frame 200 (as illustrated in FIGS. 17A-18B), along the top surface of a frame, or even along a vertical portion of the frame 200 extending between the bottom surface and the top surface of the frame 200. For each of the locations, the same profile of the flange 560 may be shaped to interface directly with the openings, regardless of their locations. Furthermore, the profile of the flange 560 may include tabs that may lock the frame relative to the clamp such that the tabs prevent the frame from moving in a lateral direction when the clamp has been tightened, regardless of the location of the opening.

Figure 19A:
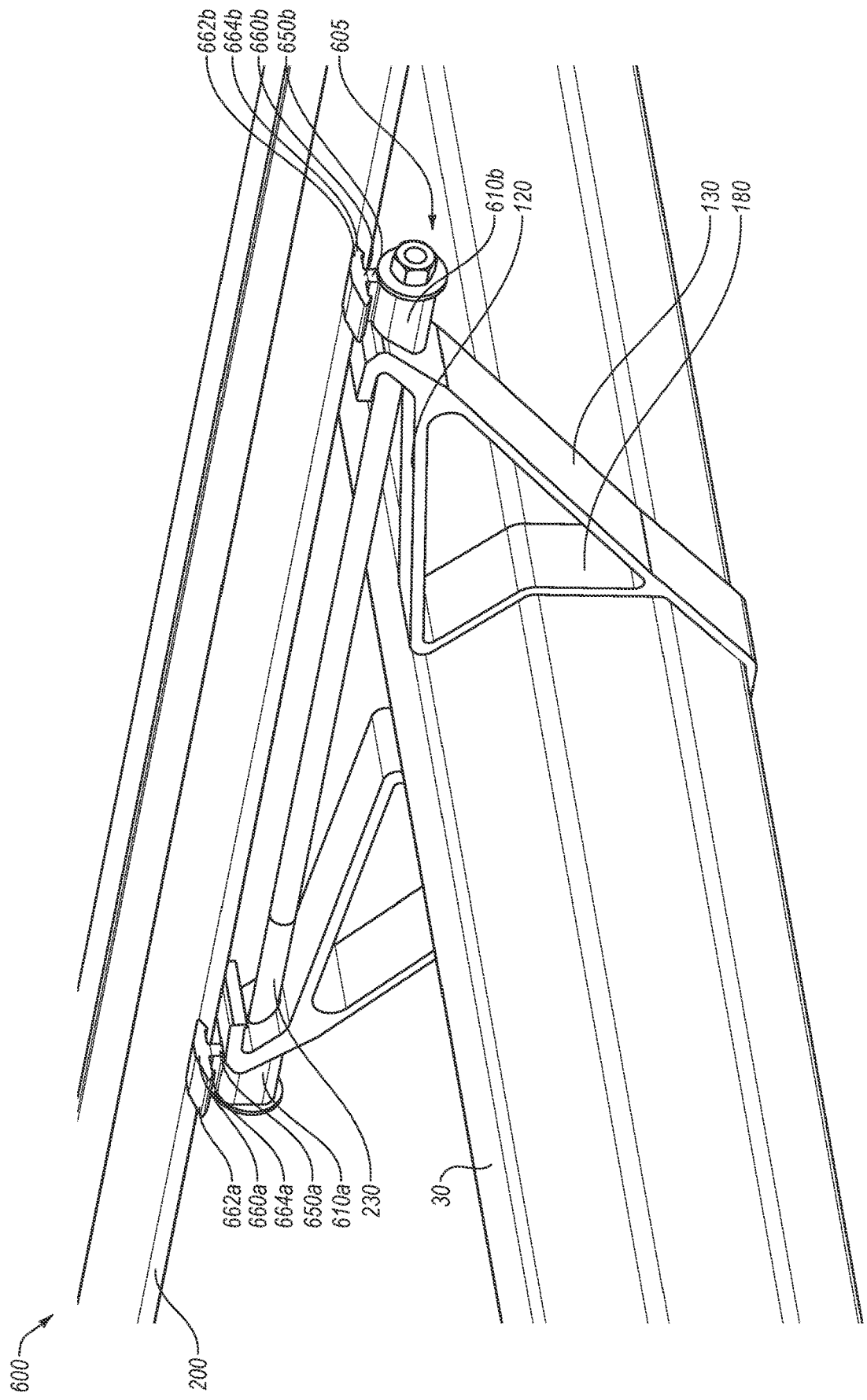
FIG. 19A is a perspective view of an example embodiment of a mounting system and a mounting bracket assembly in accordance with the present disclosure.

FIG. 19A is a perspective view of an example embodiment of a mounting system 600 in accordance with the present disclosure. FIG. 19B is a side view of the example embodiment of FIG. 19A. The mounting system 600 includes clamps 610a, 610b that may be similar or comparable to the clamp 110 of FIGS. 1A and 1B. For example, the clamp 610a may include an arm 650a, a flange 660a, an ear 662a, and a tab 664a, and the clamp 610b may include an arm 650b, a flange 660b, an ear 662b, and a tab 664b. Additionally, the mounting system 600 may include the frame 200 as described in relation to the frame 200 of FIGS. 17A and 17B.

The frame 200 may include one or more openings along a bottom part of the frame 200. The ears 662a, 662b and the tabs 664a, 664b associated with each clamp 610a, 610b may be positioned to interface with openings along the frame 200 to provide alignment and/or locking of the PV module. In these and other embodiments, the clamps 610a, 610b of FIGS. 19A and 19B may operate in a similar manner to the clamp 510 of FIGS. 17A and 17B. The sloping surface of the clamps 610a, 610b may interface with a sloping surface of the mounting bracket assembly 605 such that as the single bolt 230 is tightened, the clamp 510 may be moved downward relative to the mounting bracket assembly 605, effectively clamping the frame 200 between the ears 662a, 662b, the tabs 664a, 664b, and the top surface of the mounting bracket assembly 605.

Figure 20A:
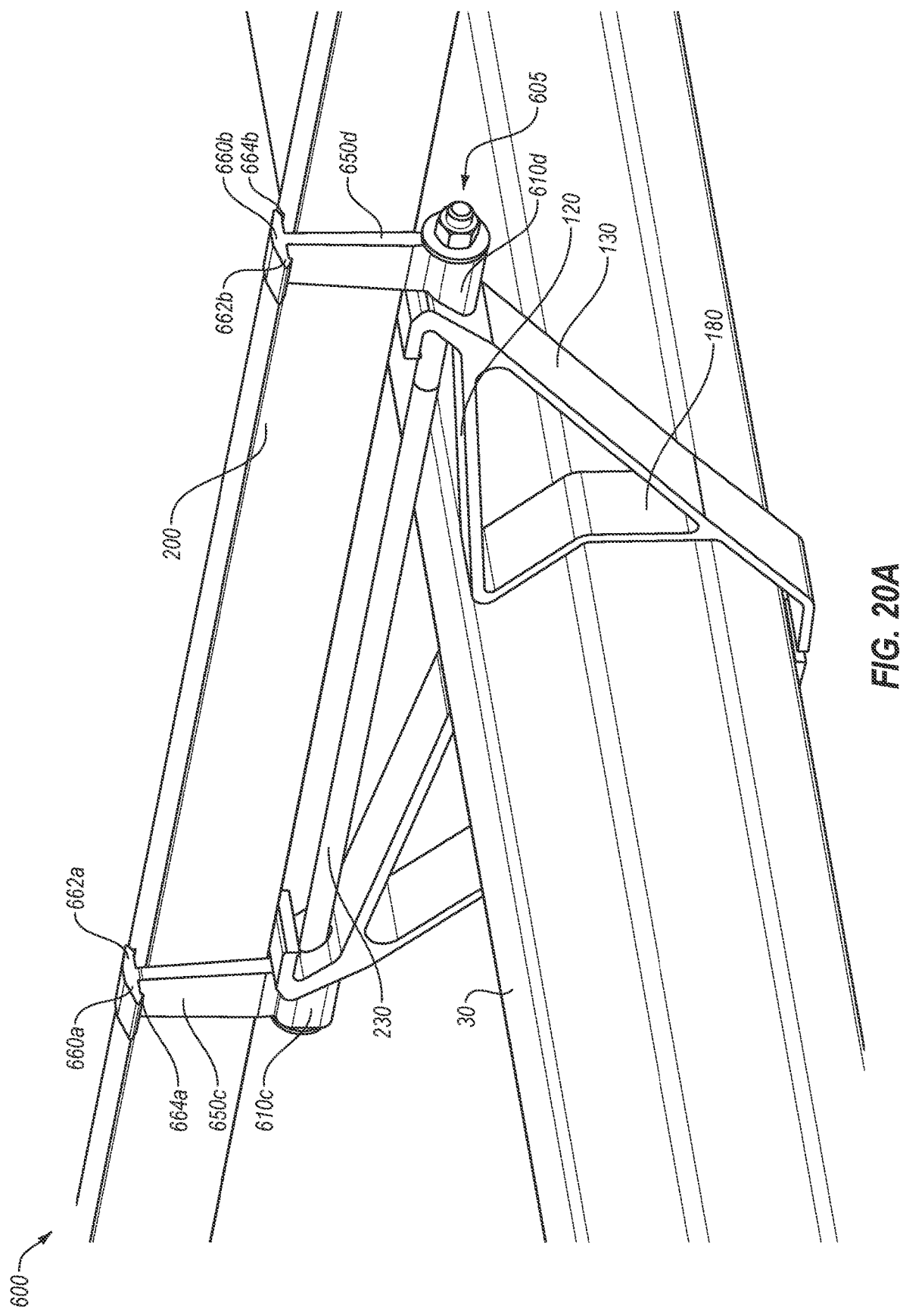
FIG. 20A is a perspective view of an example embodiment of a mounting system and a mounting bracket assembly in accordance with the present disclosure.

FIG. 20A is a perspective view of an example embodiment of a mounting system and a mounting bracket assembly in accordance with the present disclosure. FIG. 20B is a side view of the example embodiment of FIG. 20A. The arms 650c, 650d of FIGS. 20A and 20B may be longer than the arms 650a, 650b of FIGS. 19A and 19B such that the ears 662a, 662b and the tabs 664a, 664b associated with each clamp 610c, 610d may be positioned to interface with openings positioned along a top part of the frame 200 to provide alignment and/or locking of the module. In some embodiments, the mounting system 600 illustrated in FIGS. 20A and 20B may operate in a similar manner to the mounting system 600 illustrated in FIGS. 19A and 19B.

Figure 21:
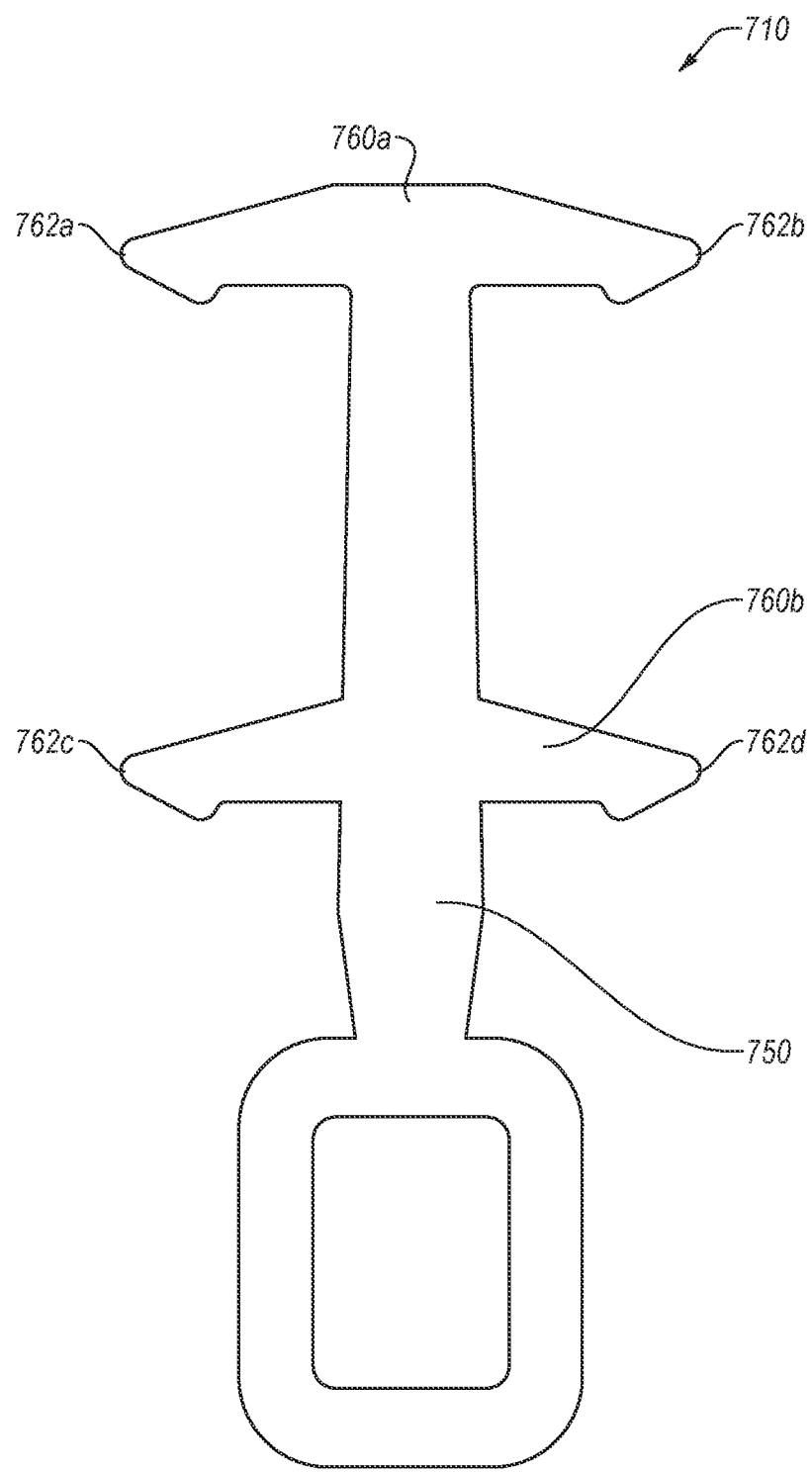
FIG. 21 is an example profile of an example clamp that may interface with a frame with multiple openings.

FIG. 21 illustrates a profile of an example clamp 710 that may interface with a frame such as the frame 200 of FIGS. 19A, 19B, 20A, and/or 20B. For example, the clamp 710 may include a first flange 760a at the end of the arm 750 with ears 762a and 762b. The clamp 710 may additionally include a second flange 760b partway along the arm 750 with ears 762c and 762d. The ear 762b of the first flange 760a may interface with a first opening on a top part of the frame 200 and the ear 762c of the second flange 160b may interface with a second opening on a bottom part of the frame 200.

Modifications, additions, or omissions may be made to the clamp 710 without departing from the scope of the present disclosure. For example, the designations of different elements in the manner described is meant to help explain concepts described herein and is not limiting. Further, the clamp 710 may include any number of other elements or may be implemented within other systems or contexts than those described.

Figure 22A:
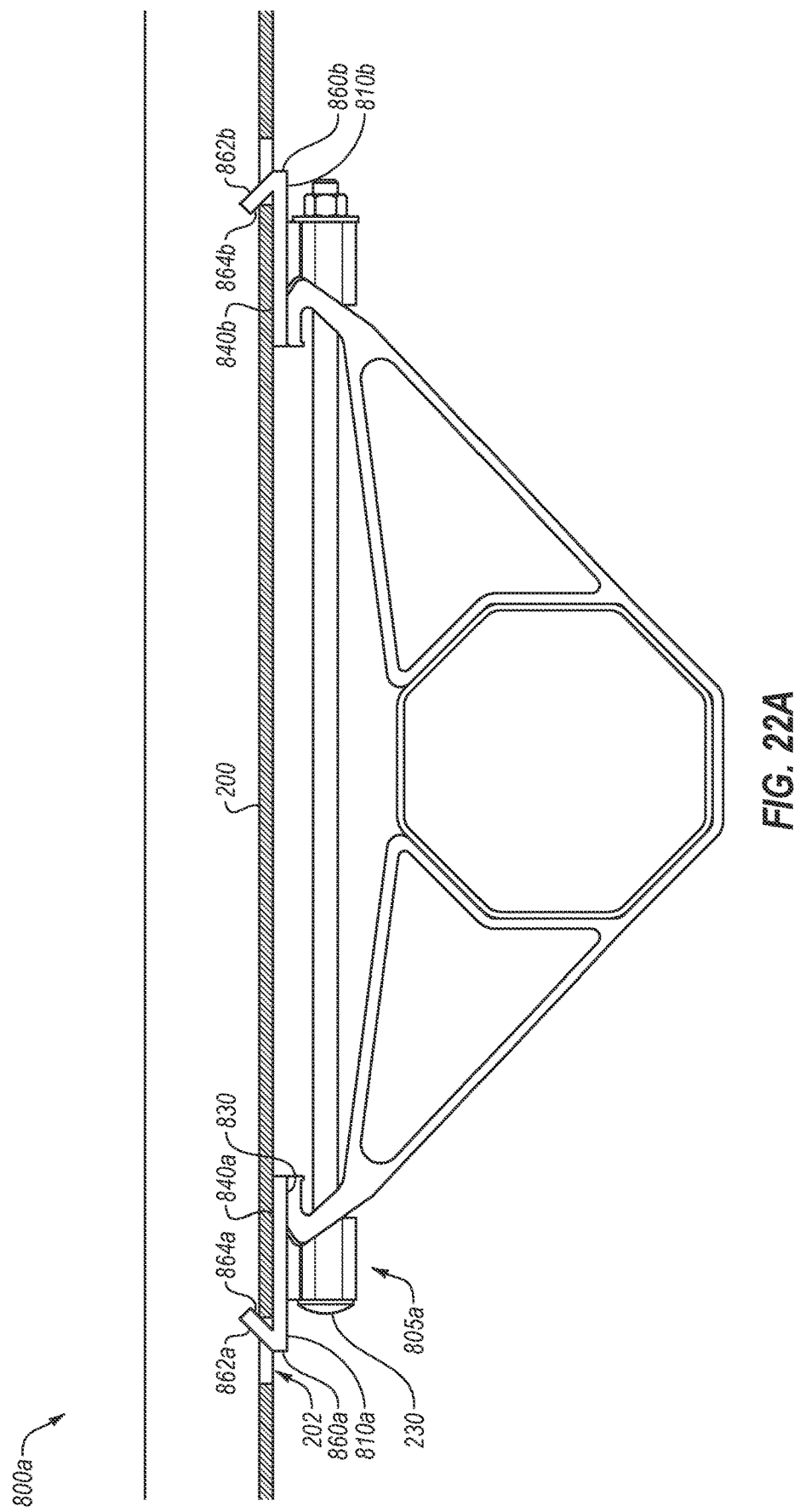

FIGS. 22A and 22B are side views of example embodiments of mounting systems 800a, 800b and mounting bracket assemblies 805a, 805b in accordance with the present disclosure. As illustrated in FIG. 22A, the mounting bracket assembly 805a may include a first clamp 810a positioned at a first end of the mounting bracket assembly 805a and a second clamp 810b that is the same as or similar to the first clamp 810a positioned at a second, opposite end of the mounting bracket assembly 805a. As illustrated in FIG. 22B, the mounting system 800b may include clamps 815 that include protruding arms 820 for additional structural support and/or a structural bar 825 positioned above the frame 200 and between the openings 202.

The bracket mounting assembly 805a may include a bracket base surface 830 positioned underneath and oriented in a plane parallel to the frame 200. The first clamp 810a may include a first flange 860a at an end of the clamp 810a. The first flange 860a may include a first flange base surface 840a positioned underneath the frame 200 and projecting in a first direction parallel to the frame 200 and away from the second clamp 810b. A first ear 862a may extend away from the first flange base surface 840a in a second direction such that the first ear 862a may interface with the first opening 202 of the frame 200. For example, a given first ear may extend vertically from a given first flange base surface and at an acute angle relative to a given first clamp from which the given first ear is attached such that the given first ear may interface with an opening of a frame positioned above the given first ear. For example, the first ear 862a may form a 90° angle, an 85° angle, an 80° angle, a 75° angle, a 70° angle, a 60° angle, etc. with the first flange base surface 840a. In some embodiments, the first ear 862a may form an obtuse angle with the first flange base surface 840a, such as a 100° angle, a 110° angle, a 120° angle, etc. The first ear 862a may include a first locking surface 864a that may move in an inward and downward direction toward the bracket base surface 830 and interface with an edge of the first opening 202 as a single bolt 230 is tightened.

The second clamp 810b may include a second flange 860b at an end of the second clamp 810b. The second flange 860b may include a second flange base surface 840b positioned underneath the frame 200 and projecting in a third direction parallel to the frame 200 and away from the first clamp 810a. In these and other embodiments, the third direction may be opposite to the first direction in which the first flange base surface 840a projects. A second ear 862b may extend away from the second flange base surface 840b in a fourth direction such that the second ear 862b may interface with the second opening of the frame 200. For example, a given second ear may extend vertically from a given second flange base surface and at an acute angle relative to a given second clamp from which the given second ear is attached such that the given second ear may interface with an opening of a frame positioned above the given second ear. For example, the second ear 862b may form a 90° angle, an 85° angle, an 80° angle, a 75° angle, a 70° angle, a 60° angle, etc. with the second flange base surface 840b. In some embodiments, the second ear 862b may form an obtuse angle with the second flange base surface 840b, such as a 100° angle, a 110° angle, a 120° angle, etc. In some embodiments, the angles formed by the first ear 862a and the second ear 862b may be mirrors of each other, such as both forming an 80° angles with their respective first and second flange base surfaces 840a/840b.

The second ear 862b may include a second locking surface 864b that may move in an inward and downward direction toward the bracket base surface 830 and interface with an edge of the second opening as the single bolt 230 is tightened. Thus, simultaneous movement of the first locking surface 864a of the first ear 862a and the second locking surface 864b of the second ear 862b toward the bracket base surface 830 may lock and/or secure positioning, alignment, and/or orientation of the frame 200 relative to the mounting bracket assembly 805a.

As illustrated in FIG. 22B, one or more structural supports may be included when locking the clamp 815 to the frame 200. For example, the clamp 815 may include a protruding arm 820 that may provide additional rigidity and structural support to the clamp 815 as the clamp 815 is tightened against the frame 200. The protruding arm 820 may be positioned at least partially in the same plane as a flange base surface 840 of the clamp 815 and may project in an at least partially horizontal direction relative to the plane of the flange base surface 840. As another example, a structural bar 825 or other structural supporting member may be provided between the locking surfaces of clamps 815 at either end of the mounting bracket assembly to provide the frame 200 with additional structural support as the clamps 815 are tightened against the frame 200.

Modifications, additions, or omissions may be made to the mounting systems 800a, 800b without departing from the scope of the present disclosure. For example, the designations of different elements in the manner described is meant to help explain concepts described herein and is not limiting. Further, the mounting systems 800a, 800b may include any number of other elements or may be implemented within other systems or contexts than those described.

Figure 23A:
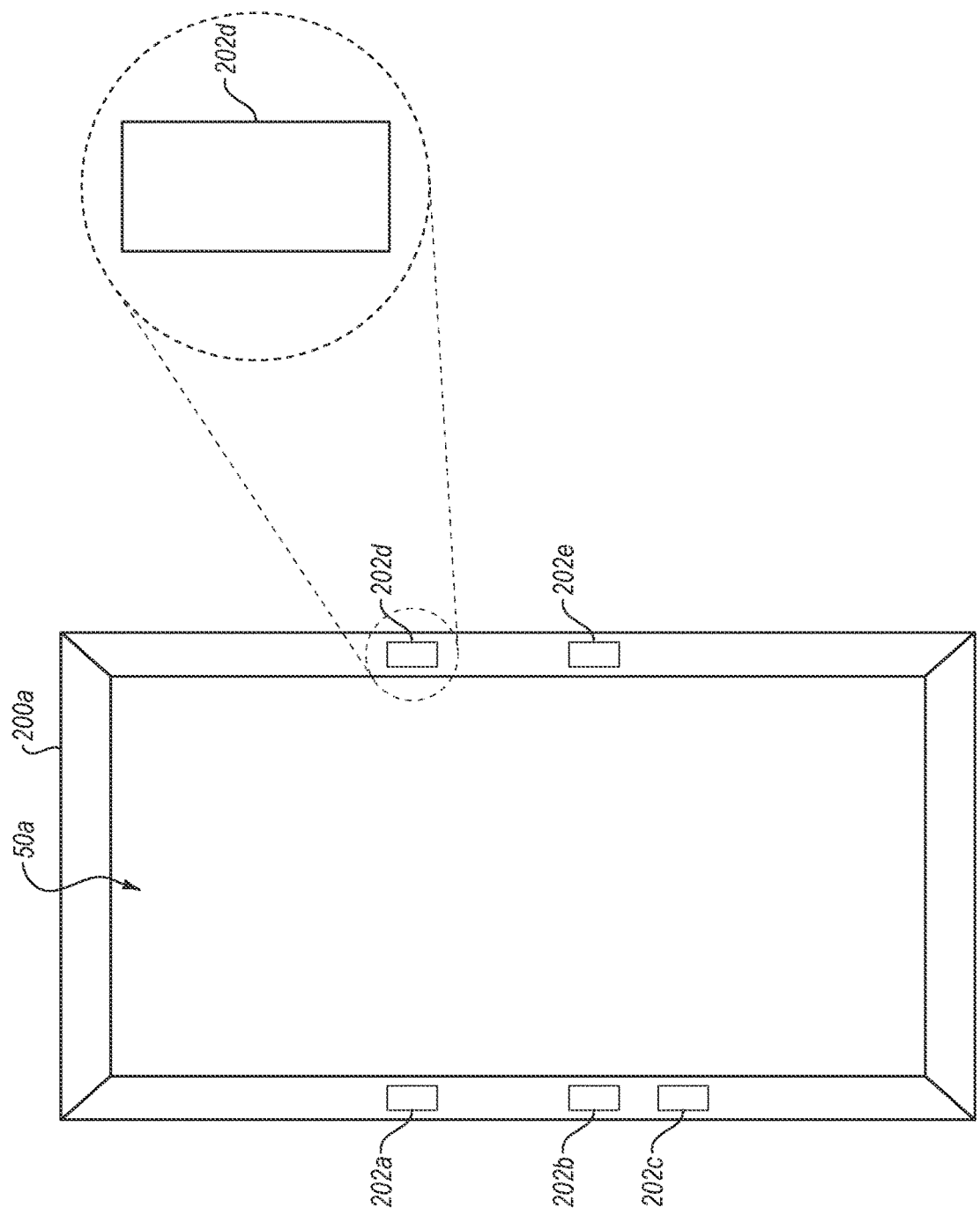
FIGS. 23A and 23B illustrate example embodiments of PV modules and frames in accordance with the present disclosure.
Figure 23B:
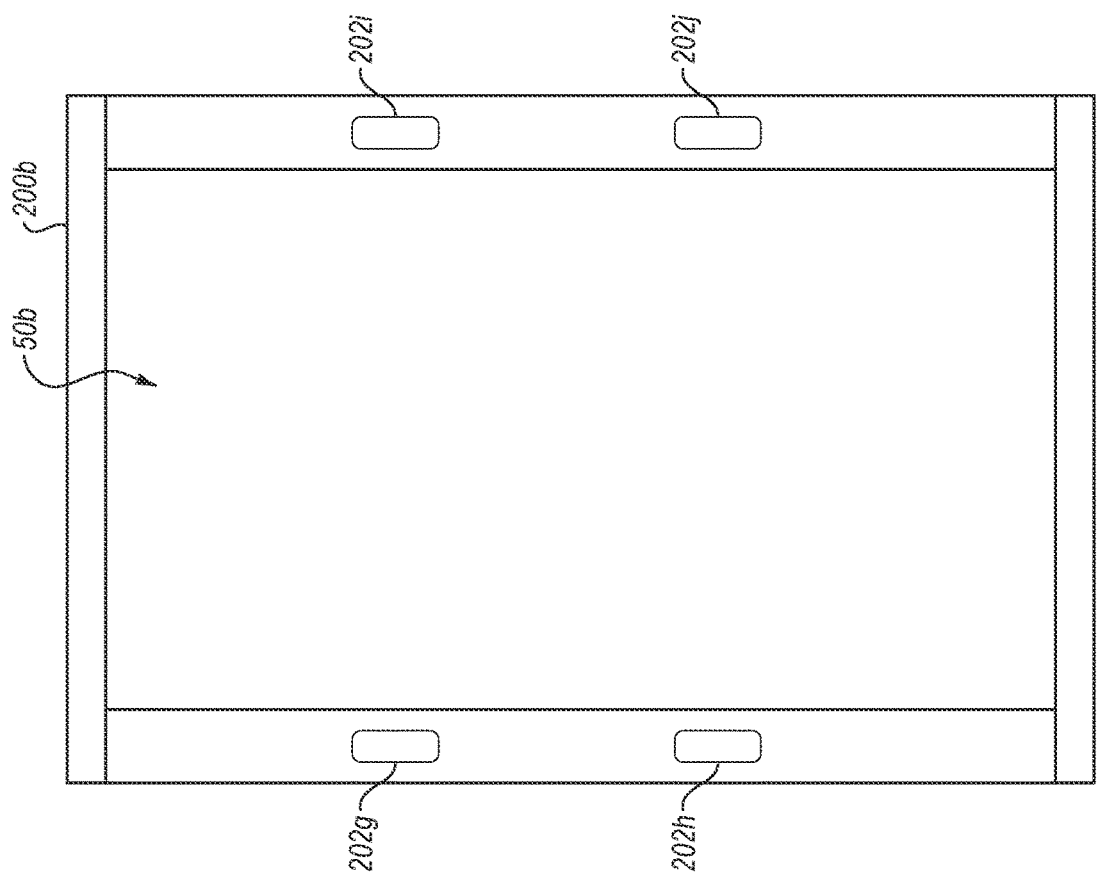

FIGS. 23A and 23B illustrate example embodiments of PV modules 50a, 50b in accordance with the present disclosure. The PV modules 50a, 50b may include corresponding frames 200a, 200b that may include one or more openings 202.

As illustrated in FIG. 23A, the frame 200a may include overall rectangular dimensions of approximately 1 meter by 2 meters, although any size of frame is contemplated in accordance with the present disclosure. For example, the PV modules may include a size of 1×1 m, 1×1.5 m, 1×1.75 m, 1.5×1.5 m, 2×2 m, etc. The openings 202 of the frame 200a may be a generally rounded rectangular shape, with dimensions of approximately ten mm by seven mm, although any size of opening is contemplated by the present disclosure. For example, the openings may be 3×8 mm, 5×10 mm, 5×15 mm, 7×15 mm, 10×20 mm, etc. In some embodiments, the openings may be spaced apart from each other along one edge of the frame 200a. By having two openings 202 in line with each other, the clamps at either end of a bracket mounting assembly may facilitate alignment of the frame 200a based on the openings in the frame being in alignment. In some embodiments the two openings 202 may be spaced linearly from each other a set distance, such as 250 mm, 300 mm, 350 mm, 400 mm, 425 mm, 450 mm, etc.

As illustrated in FIG. 23A, in some embodiments more than two openings 202 may be found along one edge of the frame 200a, such as the three openings 202a, 202b, and 202c. In these and other embodiments, the use of three or more openings 202a-c may accommodate different sizes of mounting bracket assemblies with different spacing between their associated clamps. For example, the openings 202a and 202b may be used for a smaller bracket mounting assembly and the openings 202a and 202c may be used for larger bracket mounting assemblies.

FIG. 23B illustrates the frame 200b. As illustrated in FIG. 22B, the frame 200b may include four openings, the openings 202g-j. By having two openings 202 on each side of the frame 200b, the PV module 50b may be aligned and locked into place with adjacent PV modules with openings 202 at the same locations.

Modifications, additions, or omissions may be made to the frames 200a, 200b without departing from the scope of the present disclosure. For example, the designations of different elements in the manner described is meant to help explain concepts described herein and is not limiting. Further, the frames 200a, 200b may include any number of other elements or may be implemented within other systems or contexts than those described.

Figure 24A:
FIGS. 24A and 24B illustrate example embodiments of holes in a frame of a PV module in accordance with the present disclosure.
Figure 24B:

FIGS. 24A and 24B illustrate example embodiments of openings 202 in a frame of a PV module in accordance with the present disclosure. As illustrated in FIG. 24A, the opening 202a may be squared-off. As illustrated in FIG. 24B, the opening 202b may include rounded edges or corners. By including rounded edges or corners, the stress of the locking of the clamp against the frame may be spread over a larger surface area. By including squared-off edges, a more precise fit may be obtained. While two examples are given, any shape or style of opening is contemplated within the scope of the present disclosure.

Modifications, additions, or omissions may be made to the openings 202 without departing from the scope of the present disclosure. For example, the designations of different elements in the manner described is meant to help explain concepts described herein and is not limiting. Further, the openings 202 may include any number of other elements or may be implemented within other systems or contexts than those described.

Figure 25A:
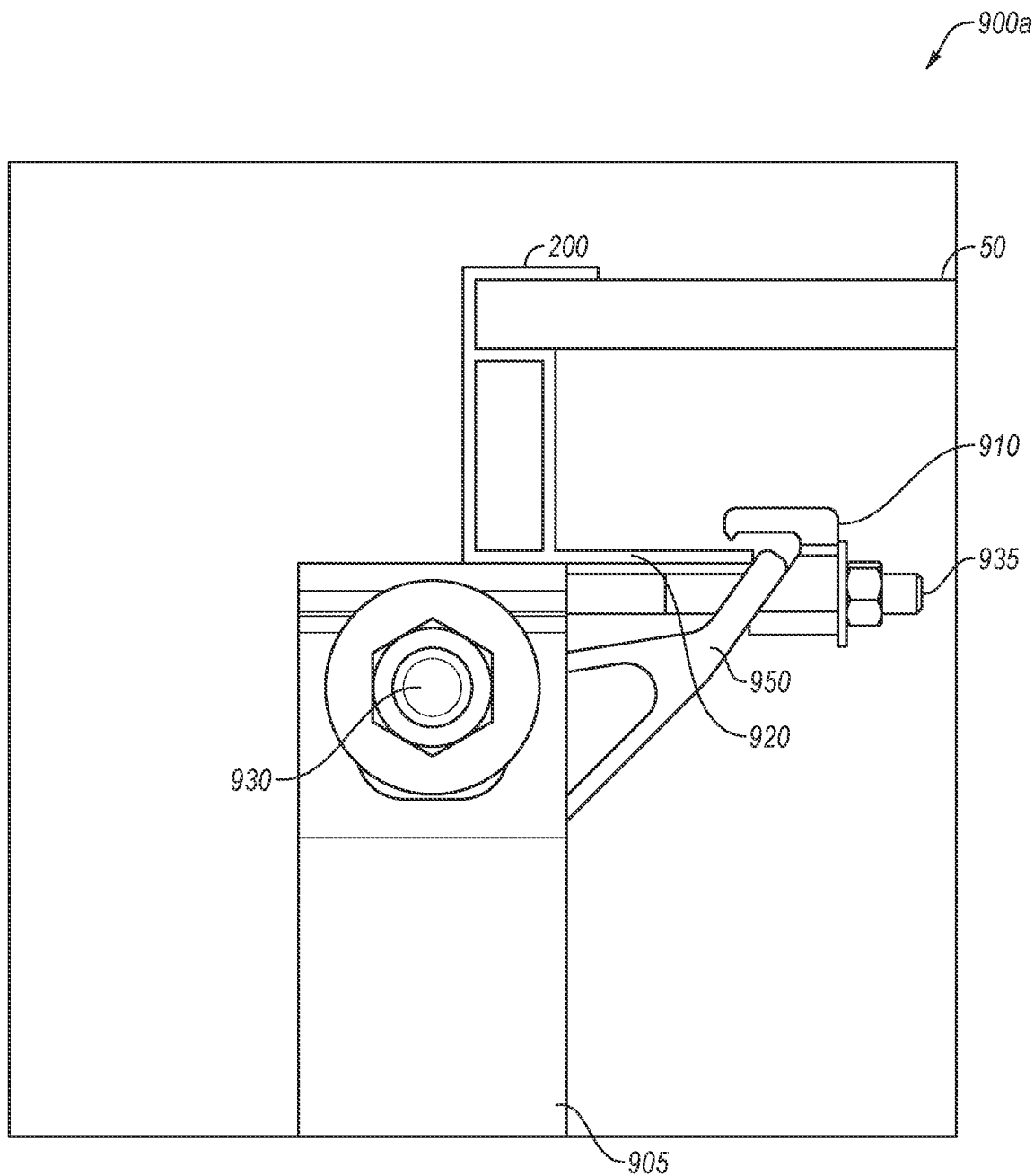
FIGS. 25A and 25B illustrate another example embodiment of a mounting system and a mounting bracket assembly in accordance with the present disclosure.
Figure 25B:
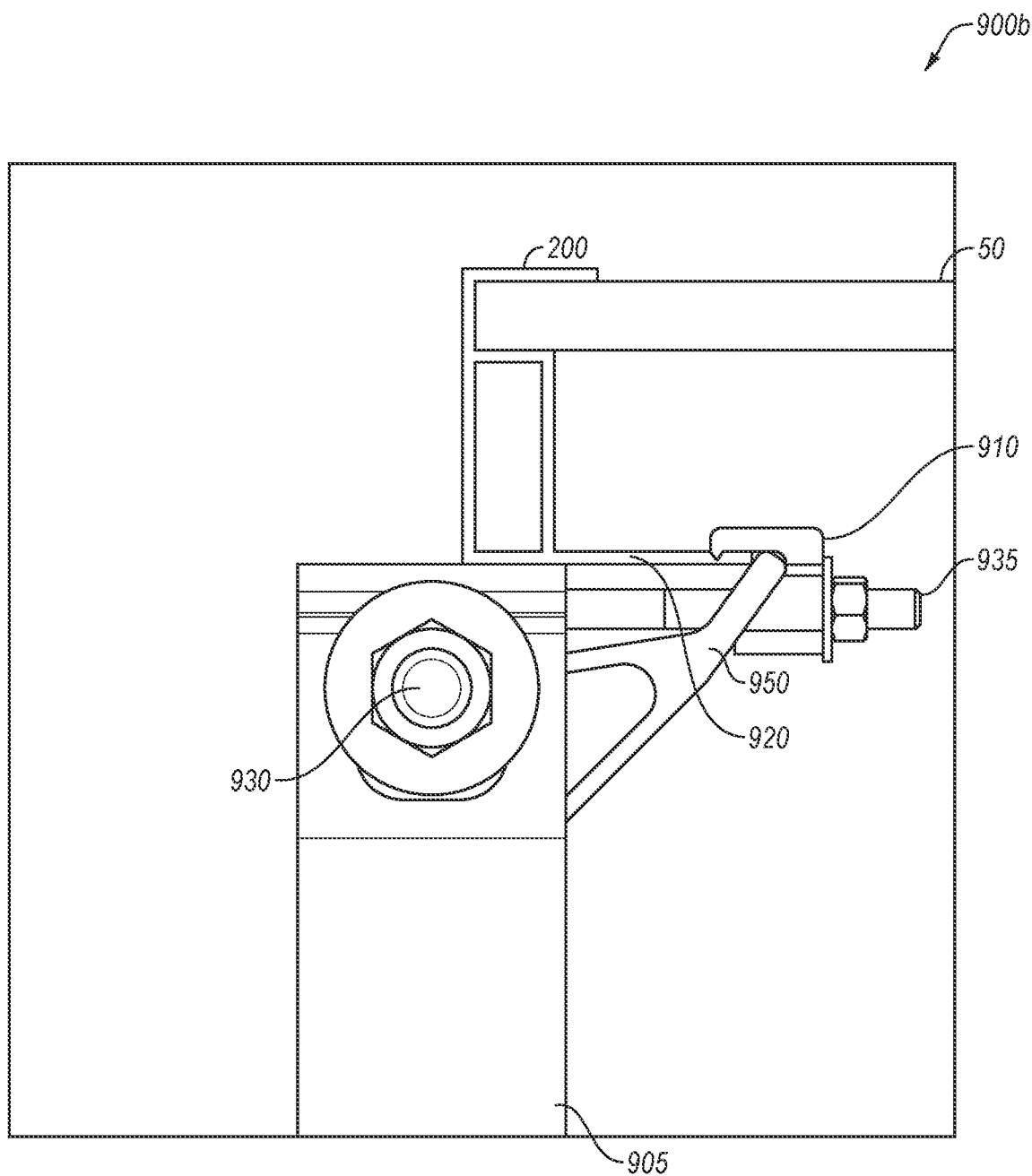

FIGS. 25A and 25B illustrate another example embodiment of mounting systems 900a, 900b and a mounting bracket assembly 905 in accordance with the present disclosure. The mounting system 900a may include a PV module 50 with a corresponding frame 200. The frame 200 may include an aspect 920 of the frame 200 extending away from the mounting bracket assembly and underneath the PV module 50. The mounting bracket assembly 905 may be similar or comparable to the mounting bracket assembly 505 of FIGS. 17A and 17B. For example, a bolt 930 may be tightened to cause the mounting bracket assembly 905 to tighten around a torque tube.

As illustrated in FIGS. 25A and 25B, an arm 950 and corresponding clamp 910 may be shaped and positioned to interface with the aspect 920 of the frame 200. The arm 950 may include a sloping surface and the clamp 910 may include a corresponding sloping surface such that as a bolt 935 extending through the clamp 910 and the arm 950 is tightened, the clamp 910 moves downwards and inwards relative to the arm 950 in a similar manner to the clamp 510 and the mounting bracket assembly 505 of FIGS. 17A and 17B. As the clamp 910 moves downwards and inwards towards the mounting bracket assembly 905, the clamp 910 may overlap with the aspect 920 of the frame 200. When the bolt 935 is sufficiently tightened, the clamp 910 may move downward and inward far enough to physically interface with the aspect 920. In some embodiments, the aspect 920 may include an opening with which the clamp 910 may interface, such as by a tab or other feature being disposed within the opening. As illustrated in FIG. 25A, the clamp 910 is up and away from the aspect 920 such that the PV module 50 with the associated frame 200 may be positioned into place relative to the clamp 910 and the mounting bracket assembly 905. As illustrated in FIG. 25B, after tightening the bolt 935, the clamp 910 may move downward and inward to interface with the aspect 920, locking the frame 200 against the mounting bracket assembly 905.

Modifications, additions, or omissions may be made to the system 900 without departing from the scope of the present disclosure. For example, the aspect 920 of the frame 200 may include an opening in the frame, a bottom portion of the frame, a lip of the frame, a top surface of the frame, a bottom surface of the frame, etc. For example, the designations of different elements in the manner described is meant to help explain concepts described herein and is not limiting. Further, the system 900 may include any number of other elements or may be implemented within other systems or contexts than those described.

Figure 26A:
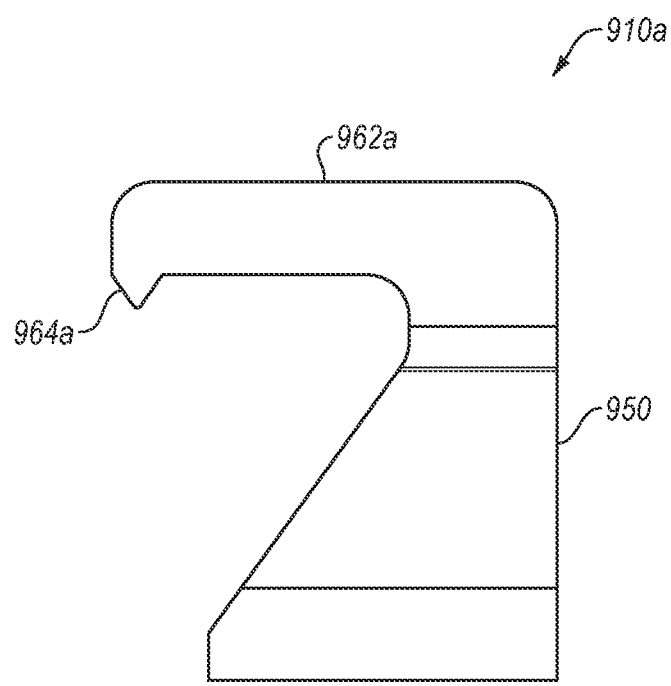
FIGS. 26A and 26B illustrate various embodiments of a clamp in accordance with the present disclosure.
Figure 26B:
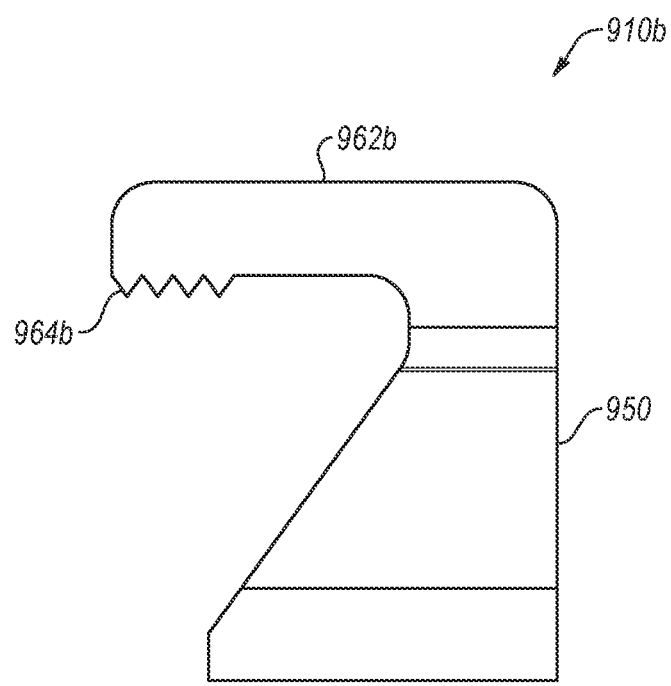

FIGS. 26A and 26B illustrate various embodiments of the clamp 910, in accordance with the present disclosure. For example the clamps 910a and/or 910b may include the arm 950 and an ear 962 with a tab 964 or other feature for interfacing with a lower portion of a frame, such as the aspect 920 of the frame 200 of FIGS. 25A and 25B. Additionally, the clamps 910a and/or 910b may include a sloping surface to facilitate the movement of the clamp downward and inward to lock a frame of a PV module to a mounting bracket assembly.

As illustrated in FIG. 26A, the clamp 910a may include the tab 964a that may interface with an opening of a frame. For example, the lower portion of the frame extending away from the mounting bracket assembly and underneath the PV module may include an opening within which the tab 964a may interface to lock the frame of the PV module against the mounting bracket assembly.

As illustrated in FIG. 26B, the clamp 910b may include teeth 964b for interfacing with the lower portion of a frame, even without an opening. In some embodiments, the clamp 910b may include any other feature for interfacing with the lower portion of the frame to reduce movement of the frame relative to the clamp 910. For example, the clamp 910b may include ridges, a rough textured region, an adhesive, a patterned region, etc. By reducing movement of the frame relative to the clamp 910b, the PV modules may be kept in alignment with any tracking that may be occurring to keep the PV module aligned with the sun. In some embodiments, the teeth 964b may provide a friction interface with the lower portion of the frame.

Modifications, additions, or omissions may be made to the clamps 910a and/or 910b without departing from the scope of the present disclosure. For example, the designations of different elements in the manner described is meant to help explain concepts described herein and is not limiting. Further, the clamps 910a and/or 910b may include any number of other elements or may be implemented within other systems or contexts than those described.

The mounting bracket and/or mounting bracket assembly mounting bracket assembly may include one or more parts and/or components, such as the top member, clamp, arm, flange, ear, bolt, etc., and one or more surfaces, such as a first sloping surface and/or a second sloping surface. One or more of the sloping surfaces may be sized and configured to engage or contact. In addition, one or more of the sloping surfaces may by complimentary or corresponding, and the sloping surfaces may facilitate movement such as by sliding. The brackets, assemblies, parts, and components disclosed herein may be used in connection with a variety of structures and devices, such as those shown in U.S. Patent Publication No. 2017/0359017; 2018/0254740; and 2018/0348331; and U.S. Pat. Nos. 8,459,249; 9,281,778; 9,581,678; 9,631,840; 10,042,030; and 10,069,455; each of which is incorporated by reference herein in its entirety.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent example, e.g., Examples 1, 2, and 3. The other examples can be presented in a similar manner. The following is a non-limiting summary of some examples presented herein.

Example 1 includes a mounting system that may include a frame associated with a power generating device, where the frame may include an opening on the frame. The mounting system may also include a bracket mounting assembly. The bracket mounting assembly may include a top member including a first surface and a clamp. The clamp may include a second surface corresponding to the first surface. The clamp may also include an arm projecting in a direction away from the top member. The clamp may additionally include a flange at least proximate a top of the arm. The flange may include an ear at the top of the arm. The flange may also include a tab on a bottom side of the ear projecting back towards the top member, where the tab may be positioned to interface with the opening on the frame. The mounting system may additionally include a bolt passing through the top member such that as the bolt is tightened, the clamp may move relative to the frame causing the ear to interface with the opening of the frame.

Example 2 includes a mounting system that may include a frame associated with a power generating device, where the frame may include a first opening and a second opening on the frame. The mounting system may also include a bracket mounting assembly. The bracket mounting assembly may also include a bracket base surface positioned underneath and projecting in a direction parallel to the frame. The bracket mounting assembly may also include a first clamp positioned at a first end of the bracket mounting assembly. The bracket mounting assembly may also include a second clamp positioned at a second end of the bracket mounting assembly. The first clamp may include a first flange positioned at a first end of the clamp and may be positioned to project through the first opening of the frame. The first flange may include a first flange base surface positioned underneath and projecting parallel to the frame away from the bracket base surface in a first direction away from a second clamp. The first flange may also include a first ear extending away from the first flange base surface in the first direction and extending in a second direction away from the bracket base surface. The first flange may also include a first locking surface to interface with the first opening of the frame. The second clamp may also include a second flange positioned at a second end of the clamp and positioned to project through the second opening of the frame. The second flange may include a second flange base surface positioned underneath and projecting parallel to the frame in a third direction opposite the first direction. The second flange may also include a second ear extending away from the second flange base surface in the third direction and extending in a fourth direction away from the bracket base surface. The second flange may also include a second locking surface to interface with the second opening of the frame. The bracket mounting assembly may additionally include a single bolt passing through the bracket mounting assembly. As the single bolt is tightened, the first clamp and the second clamp may move towards each other, and one or more edges of the first opening may interface with the first locking surface. The mounting system may additionally include one or more edges of the second opening that interface with the second locking surface.

Example 3 includes a power-generating system that may include a plurality of photovoltaic modules. The power-generating system may also include a mounting system connecting each photovoltaic module of the plurality of photovoltaic modules. The mounting system may include one or more frame, where each frame may be associated with one or more photovoltaic modules of the plurality of photovoltaic modules and each frame may include an opening on the frame. The mounting system may also include a bracket mounting assembly associated with each frame. The bracket mounting assembly may include a top member including a first surface and a clamp. The clamp may include a second surface corresponding to the first surface. The clamp may also include an arm projecting in a direction away from the top member. The clamp may also include a flange at least proximate a top of the arm. The flange may include an ear at the top of the arm. The flange may also include a tab on a bottom side of the ear projecting back towards the top member, where the tab may be positioned to interface with the opening on the frame. The bracket mounting assembly may additionally include a bolt passing through the top member such that as the bolt is tightened, the clamp may move relative to the frame causing the ear to interface with the opening of the frame. The bracket mounting assembly may also include an angled bottom member connected to the top member at opposite ends of the top member. The bracket mounting assembly may also include a ring that defines a beam insertion aperture between the top member and the angled bottom member. The mounting system additionally may include a torsion beam inserted through the angled bottom member, where tightening the bolt may move the clamp relative to the frame causing the ear to interface with the opening of the frame in a direction towards the torsion beam. The power-generating system may additionally include a motor configured to supply motion to the torsion beams.

Example 4 includes a mounting system that may include a frame associated with a power generating device. The mounting system may also include a bracket mounting assembly. The bracket mounting assembly may include a top member including a first surface and a clamp. The clamp may include a second surface corresponding to the first surface. The clamp may also include an arm projecting in a direction away from the top member. The clamp may also include includes a flange at least proximate a top of the arm. The flange may include an ear at the top of the arm. The flange may also include a tab on a bottom side of the ear projecting back towards the top member, where the tab may be positioned to interface with an aspect of the frame. The mounting system may additionally include a bolt passing through the top member such that as the bolt is tightened, the clamp may move relative to the frame, thereby causing the ear to interface with the aspect of the frame. The aspect of the frame may include an opening in the frame, a bottom portion of the frame, a lip of the frame, a top surface of the frame, and/or a bottom surface of the frame.

In some examples, the flange at least proximate the top of the arm may further comprise a second ear at the top of the arm, wherein the second ear projects outward from the top of the arm in a direction opposite and parallel to the ear, the second ear comprising a second tab on a bottom side of the second ear projecting back towards the top member.

In some examples, the mounting system may further comprise a second frame associated with a second power generating device. In such examples, the second frame may include an opening of the second frame. the second frame is positioned adjacent to the first frame and is oriented in a same direction as the first frame. In such examples, the second ear and the second tab may be positioned to interface with the opening of the second frame.

In some examples, the ear and the tab may project through the opening on the frame such that tightening the single bolt causes the ear and the tab to interface with an edge of the opening.

In some examples, the bolt may include a single bolt passing through both the top member and the clamp such that as the single bolt is tightened, the clamp may move relative to the top member along an interface between the first sloping surface and the second sloping surface.

In some examples, the ear may have a profile that slopes away from the top of the arm. In such examples, the profile of the ear may be an arced profile.

In some examples, the bracket mounting assembly may include an angled bottom member connected to the top member at opposite ends of the top member. In such examples, one or more strengthening members may be connected between the top member and the angled bottom member. In such examples, at least one of the top member, the angled bottom member, or the one or more strengthening members may be made of a flexible or semi-flexible material. In such examples, the flexible or semi-flexible material may include one or more materials selected from the group consisting of cast aluminum, extruded aluminum, injection molded plastic, steel, and fiberglass.

In some examples, the bracket mounting assembly may include an angled bottom member connected to the top member at opposite ends of the top member. In such examples, a ring may define a beam insertion aperture between the top member and the angled bottom member. In such examples, a torsion beam may be inserted through the angled bottom member, wherein tightening the single bolt moves the clamp relative to the top member along an interface between the first surface and the second surface towards the torsion beam. In such examples, a profile of the torsion beam may be selected from the group consisting of round, square, hexagonal, octagonal, and rounded with flat edges on one or more sides. In such examples, the ring that defines the beam insertion aperture may correspond with the profile of the torsion beam.

In some examples, the mounting system may include the frame including a second opening on the frame. In such examples, the flange may further comprise a lower ear positioned along the arm projecting in a direction away from the top member and between a top surface of the top member and the flange, wherein the lower ear comprises a lower tab on a bottom side of the lower ear projecting back towards the top member, the lower tab positioned to interface with a second opening on the frame.

In some examples, the first clamp may further comprise a first protruding arm positioned in the same plane as the first flange base surface and projecting in the first direction. In such examples, the second ear may further comprise a second protruding arm positioned in the same plane as the second flange base surface and projecting in the third direction.

In some examples, the mounting system may include a structural bar positioned above the frame and between the first locking surface and the second locking surface.

In some examples, the second direction and the fourth direction may be a same direction.

In some examples, the second direction and the fourth direction may be different directions.

In some examples, the ear and the tab may project through the opening on the frame such that tightening the single bolt causes the ear and the tab to interface with an edge of the opening.

In some examples, the tab may include ridges, a rough textured region, an adhesive, or a patterned region.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:
1. A mounting system comprising:
    a frame associated with a power generating device, the frame including defining an opening in a lateral side of the frame; and
    a bracket mounting assembly comprising:
        a top member including a first surface;
        a clamp comprising:
            a second surface configured to interface with the first surface;
            an arm projecting above the top member; and a flange at a top of the arm, the flange comprising an ear that is configured to be inserted into the opening on the lateral side of the frame;

wherein a sliding engagement between the first surface and the second surface causes the clamp to move relative to the frame and to interlock the ear within the opening of the frame.

2. The mounting system of claim 1, wherein the flange comprises a second ear at the top of the arm.

3. The mounting system of claim 2, further comprising a second frame associated with a second power generating device, wherein:
the second frame defines a second opening in a lateral side of the second frame;
the second frame is positioned adjacent to the frame and is oriented in a same direction as the frame; and
the second ear is configured to be inserted into the second opening on the lateral side of the second frame.

4. The mounting system of claim 1, wherein tightening of a bolt causes the sliding engagement.

5. The mounting system of claim 1, further comprising a bolt passing through both the top member and the clamp such that tightening the bolt causes the sliding engagement.

6. The mounting system of claim 1, wherein the ear has a profile that slopes away from the top of the arm.

7. The mounting system of claim 6, wherein the profile of the ear is an arced profile.

8. The mounting system of claim 1, wherein the bracket mounting assembly further comprises:
an angled bottom member connected to the top member; and
one or more strengthening members connected between the top member and the angled bottom member.

9. The mounting system of claim 8, wherein at least one of the top member, the angled bottom member, or the one or more strengthening members are made of a flexible or semi-flexible material.

10. The mounting system of claim 9, wherein the flexible or semi-flexible material includes one or more materials selected from the group consisting of cast aluminum, extruded aluminum, injection molded plastic, steel, and fiberglass.

11. The mounting system of claim 1, wherein the bracket mounting assembly further comprises:
an angled bottom member connected to the top member;
a ring that defines a beam insertion aperture between the top member and the angled bottom member; and
a torsion beam inserted through the angled bottom member, wherein tightening a bolt moves the clamp relative to the top member along an interface between the first surface and the second surface towards the torsion beam.

12. The mounting system of claim 11, wherein:
a profile of the torsion beam is selected from the group consisting of round, square, hexagonal, octagonal, and rounded with flat edges on one or more sides; and
the ring that defines the beam insertion aperture corresponds with the profile of the torsion beam.

13. The mounting system of claim 1, wherein:
the frame further comprises a second opening on the frame; and
the flange further comprises a lower ear positioned along the arm projecting in a direction away from the top member and between a top surface of the top member and the flange, wherein the lower ear comprises a lower tab on a bottom side of the lower ear projecting back towards the top member, the lower tab positioned to interface with a second opening on the frame.

14. A power-generating system comprising:
a plurality of photovoltaic modules;
a mounting system connecting each photovoltaic module of the plurality of photovoltaic modules, the mounting system comprising:
one or more frames, wherein each frame is associated with one or more photovoltaic modules of the plurality of photovoltaic modules and each frame defines an opening in a lateral side; and
a bracket mounting assembly associated with each frame, the bracket mounting assembly comprising:
a top member including a first surface;
a clamp comprising:
a second surface configured to interface with the first surface;
an arm projecting above the top member; and
a flange at a top of the arm, the flange comprising an ear that is configured to be inserted into the opening on the lateral side of the frame;
a bolt passing through the top member such that a tightening of the bolt causing a sliding engagement between the first surface and the second surface to cause the clamp to move relative to the frame and to interlock the ear with the opening of the frame;
an angled bottom member connected to the top member at opposite ends of the top member;
a ring that defines a beam insertion aperture between the top member and the angled bottom member; and
a torsion beam inserted through the angled bottom member, wherein tightening the bolt moves the clamp relative to the frame causing the ear to interface with the opening of the frame in a direction towards the torsion beam; and
a motor configured to supply motion to the torsion beams.

15. The mounting system of claim 1, wherein the clamp further comprises a tab that extends from the ear such that when the bracket is in an engaged configuration with the frame, the tab retains the ear within the opening.

16. The power-generating system of claim 14, wherein the clamp further comprises a tab that extends from the ear such that when the bracket is in an engaged configuration with the frame, the tab retains the ear within the opening.

* * * * *